United States Patent
Yasuda et al.

(10) Patent No.: US 10,707,483 B2
(45) Date of Patent: Jul. 7, 2020

(54) ELECTRODE, SECONDARY BATTERY, BATTERY PACK, AND VEHICLE

(71) Applicants: KABUSHIKI KAISHA TOSHIBA, Minato-ku (JP); Toshiba Infrastructure Systems & Solutions Corporation, Kawasaki-shi (JP)

(72) Inventors: Kazuhiro Yasuda, Kawasaki (JP); Yusuke Namiki, Yokohama (JP); Tetsuya Sasakawa, Yokohama (JP); Yasuhiro Harada, Isehara (JP); Norio Takami, Yokohama (JP)

(73) Assignees: KABUSHIKI KAISHA TOSHIBA, Minato-ku (JP); Toshiba Infrastructure Systems & Solutions Corporation, Kawasaki-shi (JP)

( * ) Notice: Subject to any disclaimer, the term of this patent is extended or adjusted under 35 U.S.C. 154(b) by 0 days.

(21) Appl. No.: 16/122,283

(22) Filed: Sep. 5, 2018

(65) Prior Publication Data
US 2019/0296337 A1    Sep. 26, 2019

(30) Foreign Application Priority Data
Mar. 22, 2018 (JP) .................................. 2018-054474

(51) Int. Cl.
*H01M 4/36* (2006.01)
*H01M 10/42* (2006.01)
(Continued)

(52) U.S. Cl.
CPC ............ *H01M 4/366* (2013.01); *B60L 50/64* (2019.02); *H01M 4/485* (2013.01); *H01M 4/62* (2013.01);
(Continued)

(58) Field of Classification Search
None
See application file for complete search history.

(56) References Cited

U.S. PATENT DOCUMENTS

2008/0199773 A1    8/2008  Deguchi et al.
2009/0061303 A1*   3/2009  Inagaki ................. H01M 4/485
                                                                429/163
(Continued)

FOREIGN PATENT DOCUMENTS

JP     2008-204788    9/2008
JP     2010-67508     3/2010
(Continued)

OTHER PUBLICATIONS

Korepp et al., Journal of Power Sources 174 (2007) 387-393, doi:10.1016/j.jpowsour.2007.06.141 (Year: 2007).*

(Continued)

*Primary Examiner* — Ula C Ruddock
*Assistant Examiner* — Anna Korovina
(74) *Attorney, Agent, or Firm* — Oblon, McClelland, Maier & Neustadt, L.L.P.

(57) ABSTRACT

According to one embodiment, an electrode including an active material-containing layer and a film is provided. The active material-containing layer contains an active material containing a titanium-containing oxide. The film is present on at least a part of a surface of the active material-containing layer. The film contains fluorine, an organic atom, and a metal ion. The fluorine includes fluorine bonded to the organic atom and fluorine bonded to the metal ion. The film satisfies a relationship of following formula (1), where (Continued)

F1 is a proportion of the fluorine bonded to the organic atom, and F2 is a proportion of the fluorine bonded to the metal ion:

$$0.1 \leq F2/F1 \leq 0.6 \quad (1).$$

9 Claims, 9 Drawing Sheets

(51) Int. Cl.
  *H01M 4/485* (2010.01)
  *H01M 4/62* (2006.01)
  *B60L 50/64* (2019.01)
  *H01M 4/02* (2006.01)

(52) U.S. Cl.
  CPC .... *H01M 10/425* (2013.01); *H01M 2004/027* (2013.01); *H01M 2010/4271* (2013.01)

(56) References Cited

U.S. PATENT DOCUMENTS

| | | |
|---|---|---|
| 2013/0078504 A1 | 3/2013 | Yasuda et al. |
| 2017/0271661 A1 | 9/2017 | Yasuda et al. |
| 2017/0358818 A1 | 12/2017 | Nakamura et al. |

FOREIGN PATENT DOCUMENTS

| | | |
|---|---|---|
| JP | 2016-162528 | 9/2016 |
| JP | 2017-168265 | 9/2017 |

OTHER PUBLICATIONS

Liu et al., J. Mater. Chem. A, 2015, 3, 8246, DOI: 10.1039/c4ta07055k (Year: 2015).*

Lampton et al., "How Regenerative Braking Works", Jan. 23, 2009, https://auto.howstuffworks.com/auto-parts/brakes/brake-types/regenerative-braking.htm (Year: 2009).*

* cited by examiner

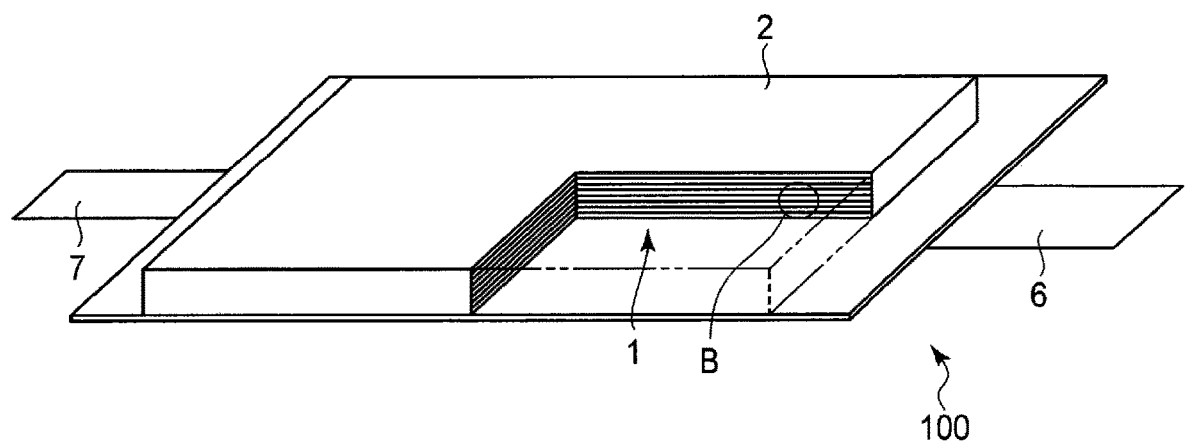
F I G. 3

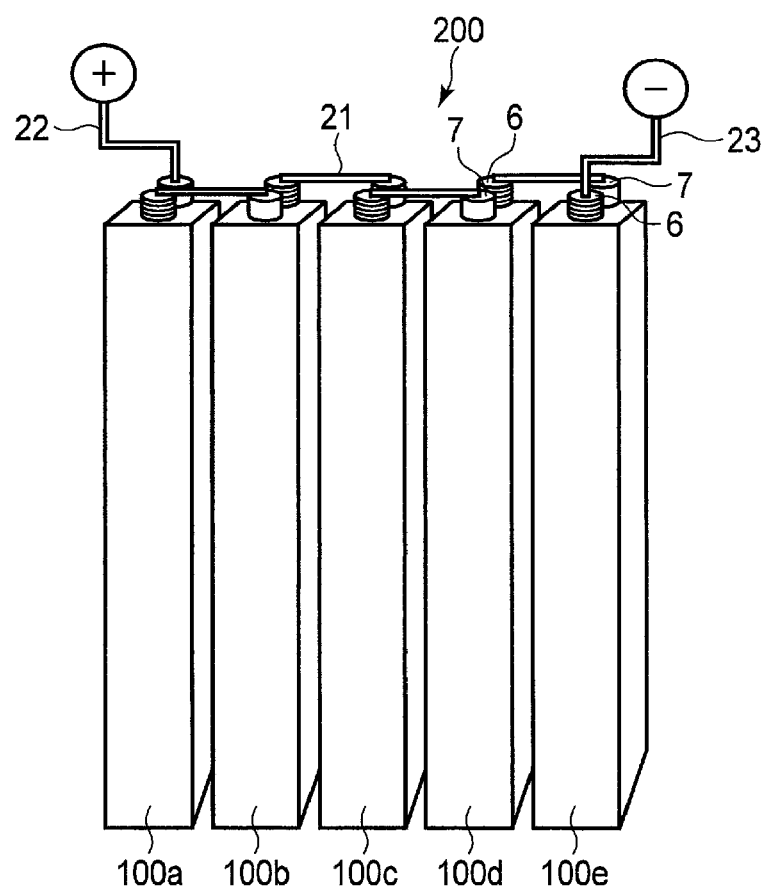
F I G. 5

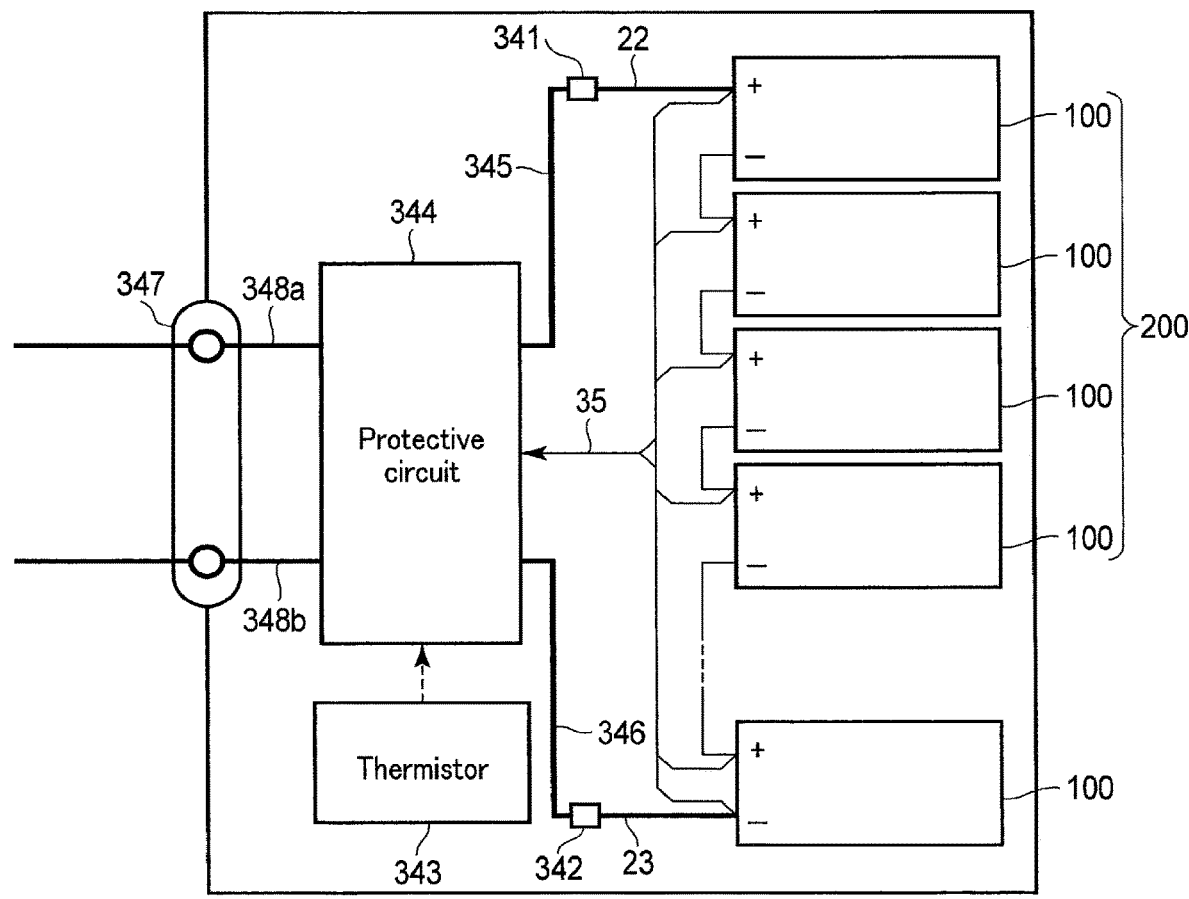
F I G. 7
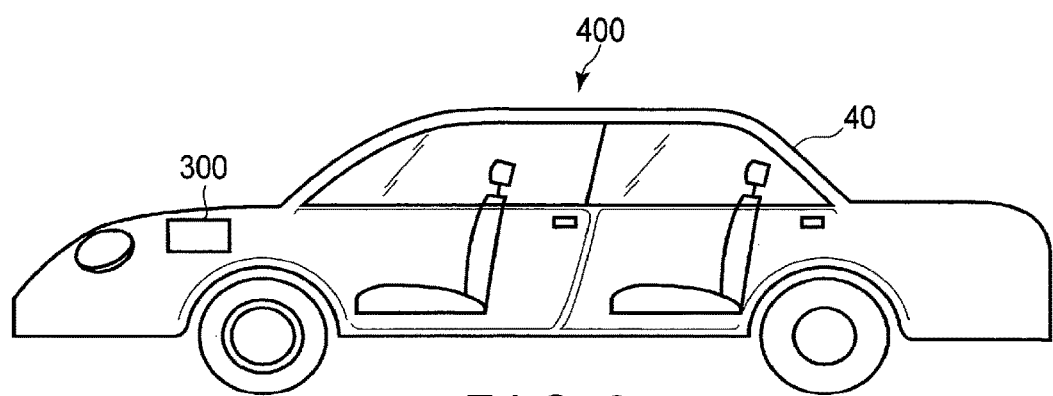
F I G. 8

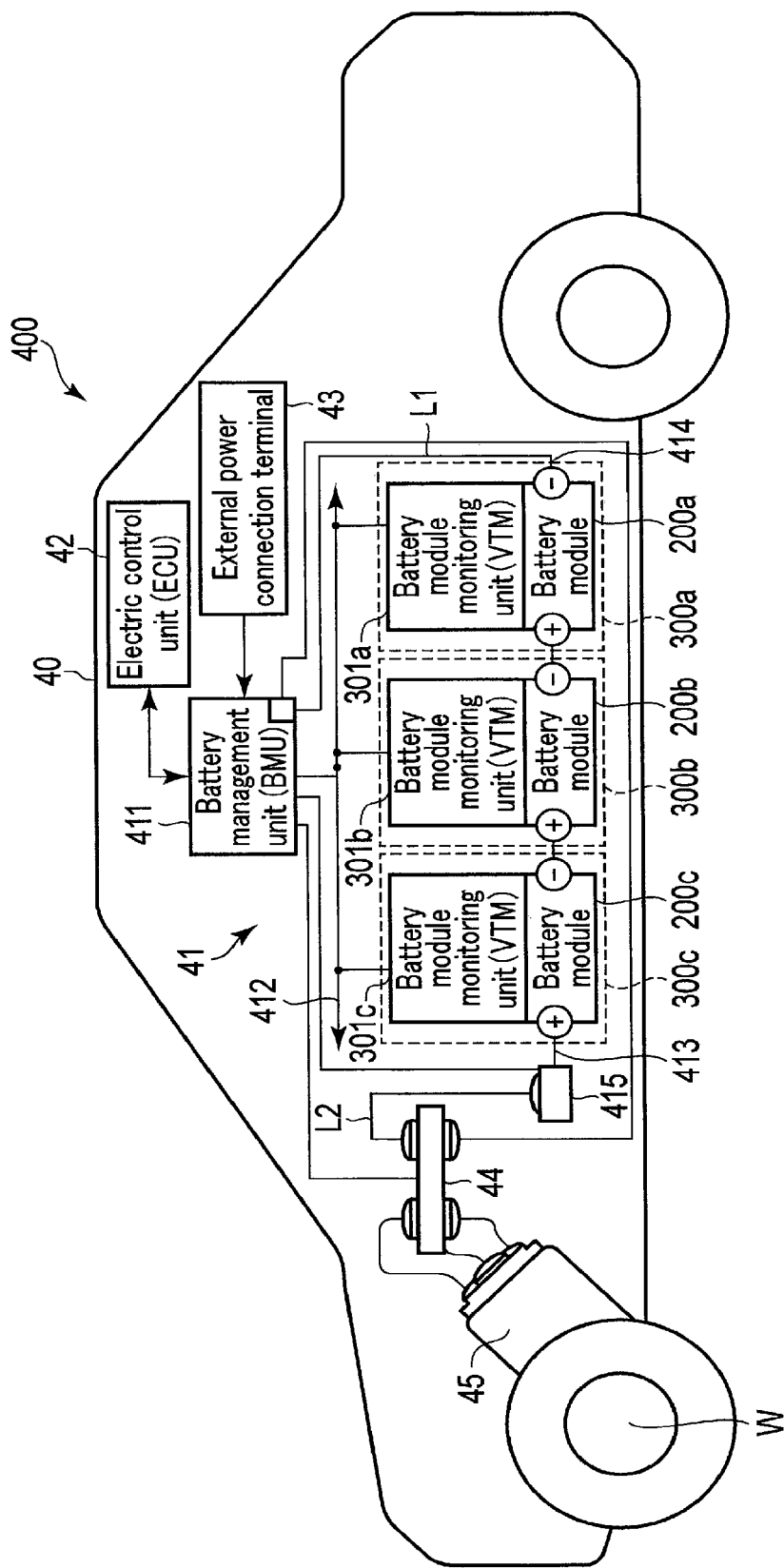
F I G. 9

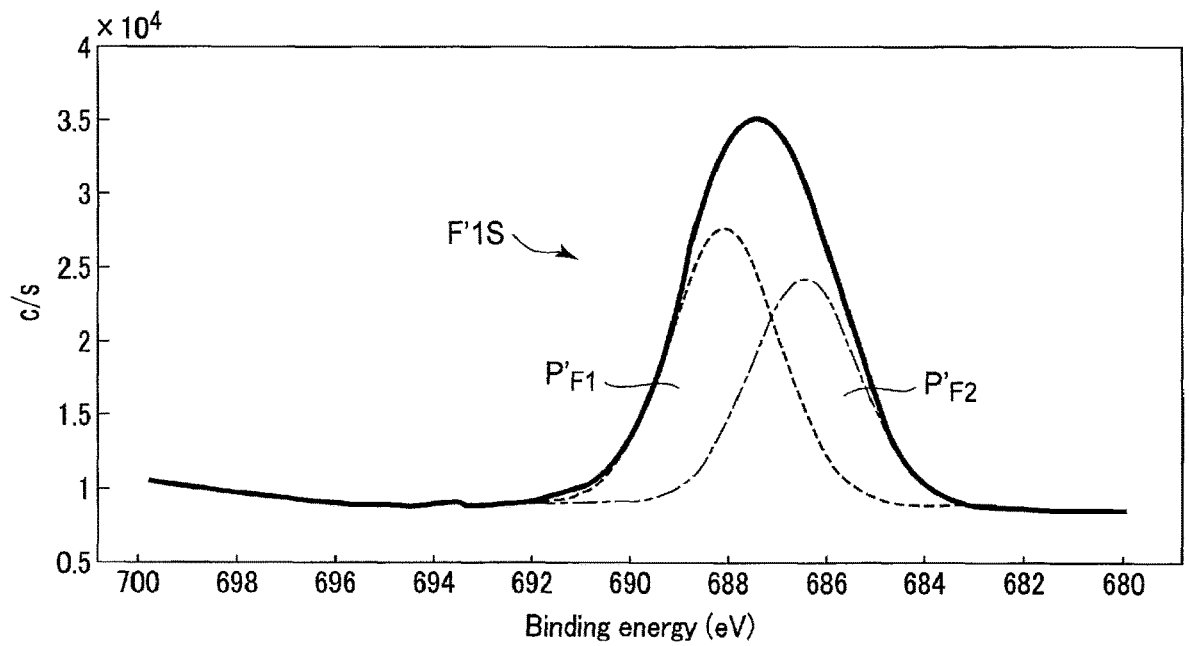
F I G. 10
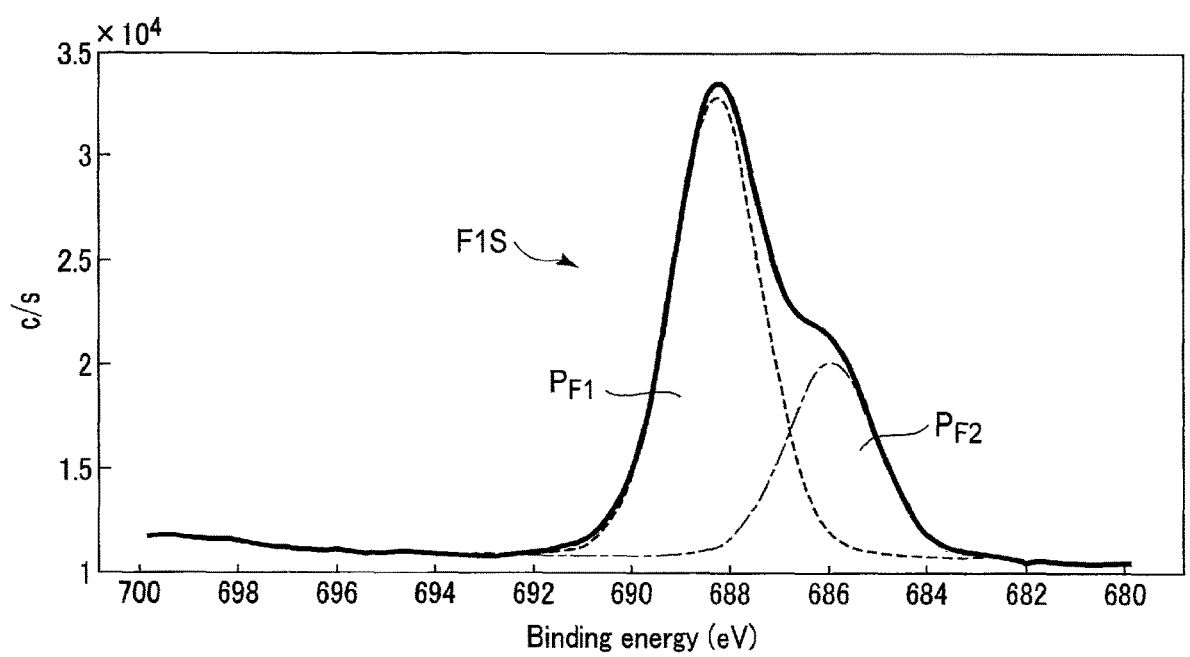
F I G. 11

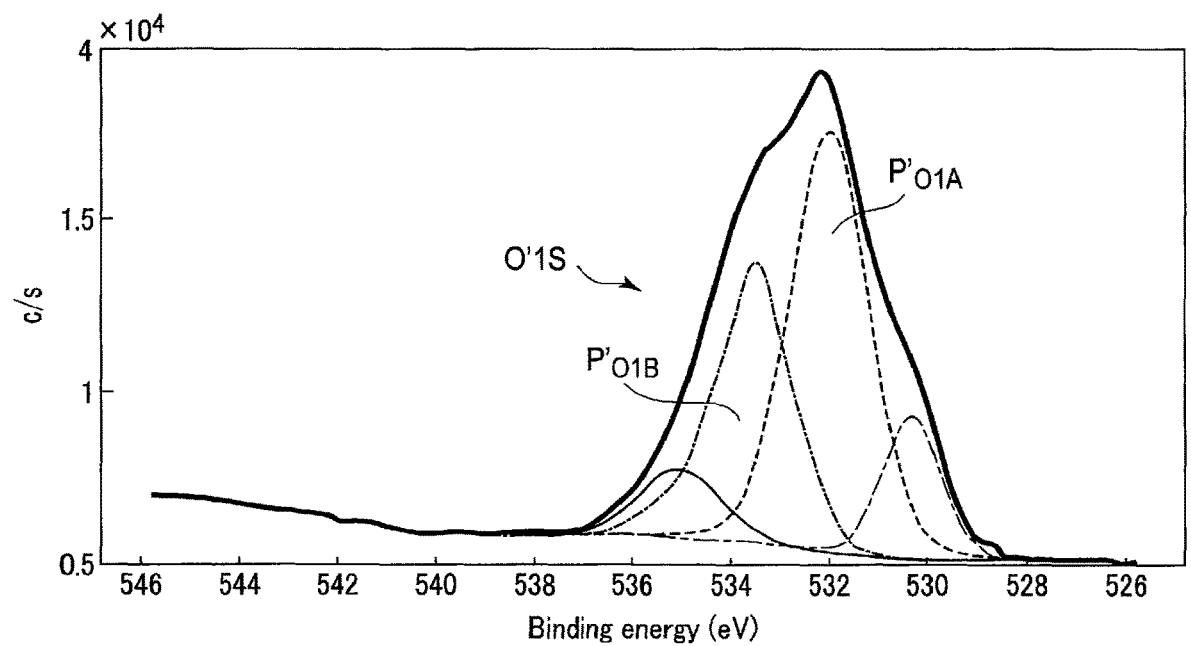
F I G. 12
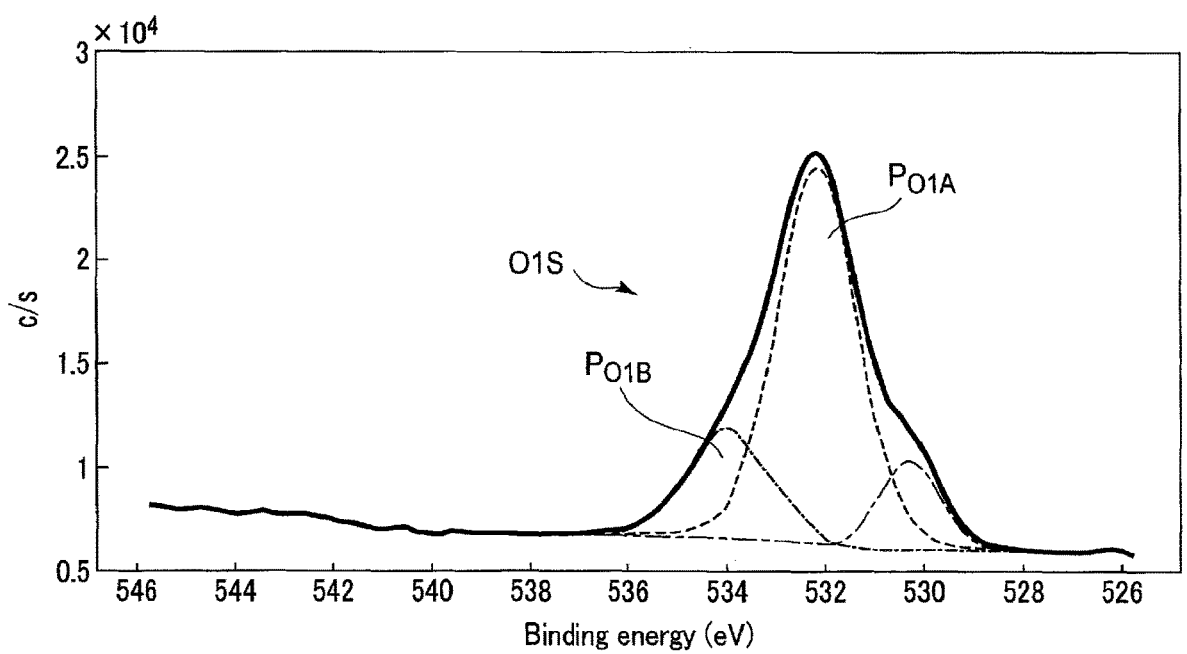
F I G. 13

ELECTRODE, SECONDARY BATTERY, BATTERY PACK, AND VEHICLE

CROSS-REFERENCE TO RELATED APPLICATION

This application is based upon and claims the benefit of priority from Japanese Patent Application No. 2018-054474, filed Mar. 22, 2018, the entire contents of which is incorporated herein by reference.

FIELD

Embodiments relate to an electrode, a secondary battery, a battery pack, and a vehicle.

BACKGROUND

Recently, as a high energy-density battery, nonaqueous electrolyte batteries such as lithium ion secondary batteries have been developed. Nonaqueous electrolyte batteries are anticipated, for example, as a power source for vehicles such as hybrid automobiles and electric cars, and as a power source for large storage use. In particular, regarding use in vehicles, there is demand for the nonaqueous electrolyte battery to have other good performances such as rapid charge-and-discharge performances and long-term reliability, as well. Being capable of rapid charge-and-discharge, nonaqueous electrolyte batteries have the benefit that charging time is remarkably short, and are able to improve motive performances, for example, in hybrid automobiles. Furthermore, the battery can also efficiently recover regenerative energy from motive force of the vehicle.

Rapid charge-and-discharge becomes possible by rapid migration of electrons and lithium ions between the positive electrode and the negative electrode. However, when a battery using a carbon-based negative electrode including a carbonaceous material is repeatedly subjected to rapid charge-and-discharge, dendrite of metallic lithium may sometimes precipitate on the electrode. Dendrites cause internal short circuits, and as a result raise concern of heat generation and ignition.

In the light of this, batteries using a metal composite oxide as a negative electrode active material in place of a carbonaceous material have been developed. In particular, in a battery using titanium oxide as the negative electrode active material, rapid charge-and-discharge can be stably performed. Such a battery also has a longer life than those using a negative electrode with carbonaceous material.

However, compared to carbonaceous materials, oxides of titanium have a higher potential (is more noble) relative to metallic lithium. Furthermore, oxides of titanium have a lower capacity per mass. Therefore, a battery using an oxide of titanium as the negative electrode active material has a problem that the energy density is lower. In addition, there is room for improvement in output and cycle life of the battery.

BRIEF DESCRIPTION OF THE DRAWINGS

FIG. 3 is a partially cutout perspective view schematically showing another example of the secondary battery according to the embodiment;

FIG. 5 is a perspective view schematically showing an example of a battery module according to an embodiment;

FIG. 7 is a block diagram showing an example of an electric circuit of the battery pack shown in FIG. 6;

FIG. 8 is a cross-sectional view schematically showing an example of a vehicle according to an embodiment; and FIG. 9 is a diagram schematically showing another example of the vehicle according to the embodiment;

FIG. 10 is one XPS spectrum of a surface of a negative electrode according to Comparative Example 1;

FIG. 11 is one XPS spectrum of a surface of a negative electrode according to Example 1;

FIG. 12 is another XPS spectrum of the surface of the negative electrode according to Comparative Example 1; and FIG. 13 is another XPS spectrum of the surface of the negative electrode according to Example 1.

DETAILED DESCRIPTION

Figure 1:
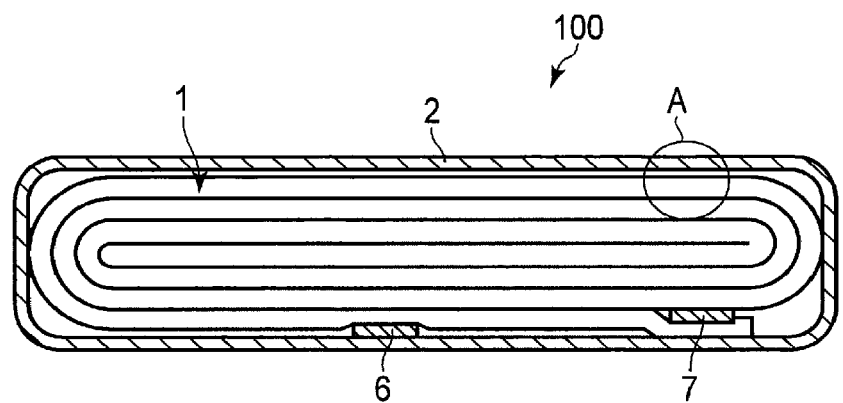
FIG. 1 is a cross-sectional view schematically showing an example of a secondary battery according to an embodiment.

According to one embodiment, an electrode including an active material-containing layer and a film is provided. The active material-containing layer contains an active material containing a titanium-containing oxide. The film is present on at least a part of a surface of the active material-containing layer. The film contains fluorine, an organic atom, and a metal ion. The fluorine contained in the film includes fluorine bonded to the organic atom, and the fluorine contained in the film includes fluorine bonded to the metal ion. The film satisfies a relationship of following Formula (1), where F1 is a proportion of the fluorine bonded to the organic atom, and F2 is a proportion of the fluorine bonded to the metal ion:

$$0.1 \le F2/F1 \le 0.6 \tag{1}.$$

According to another embodiment, a secondary battery including a negative electrode, a positive electrode, and an electrolyte is provided. The negative electrode is the electrode according to the above embodiment.

According to yet another embodiment, a battery pack including the secondary battery according to the above embodiment is provided.

According to still another embodiment, provided is a vehicle including the battery pack according to the above embodiment.

Embodiments are explained below, referring to drawings. The same number is applied to common structures throughout the following embodiments, and overlapped explanations are omitted. In addition, each drawing is a schematic view for encouraging explanations of the embodiment and understanding thereof, and thus there are some details in which a shape, a size and a ratio are different from those in a device actually used, but they can be appropriately design-changed considering the following explanations and known technology.

First Embodiment

An electrode according to a first embodiment includes an active material-containing layer containing an active material, and a film present on at least a part of a surface of the active material-containing layer. The active material contains a titanium-containing oxide. The film contains fluorine, organic atoms, and metal ions. Among the fluorine contained in the film, a proportion F1 of fluorine bonded to the organic atoms and a proportion F2 of fluorine bonded to metal ions satisfy the relationship of Formula (1): 0.1≤F2/F1≤0.6.

When a lithium ion secondary battery such as a nonaqueous electrolyte battery is charged and discharged, lithium extracted from a positive electrode at the time of charging may undergo a side reaction with an electrolyte. When the side reaction occurs, lithium that should be inserted into a negative electrode is consumed by this side reaction, and thus, an appropriate amount of lithium is not inserted into the negative electrode. In this manner, a state where only an electric charge flows from the positive electrode to the negative electrode is formed. In this state, a potential of the positive electrode excessively rises due to charging, and thus, a battery voltage reaches a predetermined voltage and charging is terminated before reaching a full-charged state. To sum up, the capacity of the battery decreases if the side reaction occurs at an interface between the negative electrode and the electrolyte.

For example, a lithium ion secondary battery produced using $Li_2Na_{0.5}Ti_{5.5}Nb_{0.5}O_{14}$, which is an example of an orthorhombic titanium-containing composite oxide, as a negative electrode active material has a relatively high battery voltage dependence of a state of charge (SOC). Therefore, the use of such an orthorhombic titanium-containing composite oxide has an advantage that it is possible to realize a battery where voltage can be easily managed based on SOC. However, when a charge-and-discharge cycle is repeated for a secondary battery, such as the battery using the orthorhombic titanium-containing composite oxide as the negative electrode, an SOC deviation caused by the side reaction of the negative electrode occurs and there is a problem that the capacity gradually decreases.

As will be described in detail below, an electrode according to the present embodiment can prevent a side reaction at the electrode in a secondary battery including the electrode. As a result, capacity reduction and battery swelling in the secondary battery can be prevented.

The electrode according to the present embodiment includes the film present on at least a part of the surface of the active material-containing layer. At least a part of the surface of the active material-containing layer may be coated with such a film (or coat). The film contains fluorine (F), organic atoms, and metal ions. The film satisfies Formula (1): 0.1≤F2/F1≤0.6. F1 is a proportion of fluorine bonded to organic atoms among the fluorine. F2 is a proportion of fluorine bonded to metal ions among the fluorine.

F1 and F2 can be obtained from an X-ray photoelectron spectrum (XPS spectrum) attained by X-ray photoelectron spectroscopy (XPS) measurement of the film. F1 corresponds to a proportion (%) of an integrated intensity of a peak component attributed to F that are bonded to organic atoms in the XPS spectrum, relative to an integrated intensity of a peak component attributed to F contained in the film. F2 corresponds to a proportion (%) of an integrated intensity of a peak component attributed to F that are bonded to metal ions in the XPS spectrum, relative to the integrated intensity of the peak component attributed to F contained in the film.

The organic atom may be, for example, carbon and/or phosphorus. F may form for example, a covalent bond with the organic atom, thereby forming a fluorine-containing organic compound. The metal ion may be, for example, an ion of a metal element contained in the electrode material. F may, for example, be ionically bonded to a metal ion, to form a fluoride. F bonded to the metal ion may be present in the film as a fluoride ion ($F^-$). Examples of the metal ion include a lithium ion and an aluminum ion.

Such a film included in the electrode according to the present embodiment can suppress the side reaction at the interface between the electrode and the electrolyte when used in the battery such as the secondary battery, for example. As a result, the electrode according to the present embodiment can suppress the side reaction of the electrode during charge-and-discharge cycles of the secondary battery and under a relatively high temperature environment. Thereby, the electrode according to the present embodiment can prevent the capacity reduction caused by the side reaction, and thus, can realize the battery exhibiting excellent life performance.

The film having a ratio F2/F1 of 0.6 or less can be regarded as containing a sufficient amount of the fluorine-containing organic compound for suppressing the side reaction. However, when the ratio F2/F1 is less than 0.1, a content of the fluorine-containing organic compound in the film may be too large, whereby a film resistance of the electrode is apt to be high. Further, the film having the ratio F2/F1 less than 0.1 is likely to be excessively thick. When an electrode having a high film resistance is used for a secondary battery, not only is output performance of the battery inferior, but also, deterioration of the electrode is caused when output, in particular, output at a large current is repeated. In addition, since a current value at the time of output is inversely proportional to an electrical resistance value, the discharge capacity of the battery decreases when the electrode with the high coat resistance is used. In particular, the capacity in the case of a high discharge rate decreases. The ratio F2/F1 is set to 0.1 or more in order not to increase the battery resistance and not to decrease the discharge capacity and output performance of the battery. The ratio F2/F1 is more preferably 0.2 to 0.5.

In what sort of bonding state that F contained in the film is present can be determined, for example, by analyzing a result of XPS measurement described later.

The XPS spectrum obtained by the XPS measurement for a sample including a film containing F has a peak F1S attributed to a is orbital of F in a binding energy range of 680 eV to 692 eV. The peak F1S can be divided into a peak component $P_{F1}$ having a peak top located at a binding energy position of 688±0.5 eV and a peak component $P_{F2}$ having a peak top located at a binding energy position of 686±0.5 eV by a method described later. The peak component $P_{F1}$ is a component attributed to F bonded to the organic atom. On the other hand, the peak component $P_{F2}$ is a component attributed to F bonded to the metal ion.

Regarding F contained in the film, F1 is a numerical value of the area of the peak component $P_{F1}$ expressed as a percentage relative to the area of the peak F1S. Further, regarding F contained in the film, F2 is a numerical value of the area of the peak component $P_{F2}$ expressed as a percentage relative to the area of the peak F1S. Therefore, the ratio F2/F1 regarding F contained in the film can be obtained by dividing the area of the peak component $P_{F2}$ by the area of the peak component $P_{F1}$.

The film present on the surface of the active material-containing layer of the electrode desirably further contains oxygen (O). Examples of such O may include O bonded to organic atoms. Such a film preferably satisfies Formula (2): 2.5≤O1A/O1B≤6. When a ratio O1A/O1B is within the above numerical range, there is a tendency that the capacity reduction can be suppressed further. The ratio O1A/O1B is more preferably in a range of 4.5 or more, and even more preferably is 5.0 or more. Further, the ratio O1A/O1B is preferably 5.9 or less, and more preferably 5.8 or less.

Here, O1A and O1B are obtained from the XPS spectrum. O1A is the amount of oxygen attributed to a peak having a peak top at a position of 532±0.5 eV in the XPS spectrum among the oxygen contained in the film and bonded to the organic atoms. That is, O1A corresponds to a proportion (%) of an integrated intensity of a peak component attributed to O having the peak top located at the binding energy position of 532±0.5 eV in the XPS spectrum, relative to an integrated intensity of a peak component attributed to O contained in the film and bonded to the organic atoms. O1B is the amount of oxygen attributed to a peak having a peak top at a position of 534±0.5 eV in the XPS spectrum among the oxygen contained in the film and bonded to the organic atoms. That is, O1B corresponds to a proportion (%) of an integrated intensity of a peak component attributed to O appearing in the binding energy range of 534±0.5 eV in the XPS spectrum, relative to the integrated intensity of the peak component attributed to O contained in the film that are bonded to the organic atoms. Each peak component will be described later.

Incidentally, examples of O contained in the film may also include O bonded to metal ions. Even for a film containing O bonded to metal ions as well as O bonded to organic atoms, it is preferable that the above-described ratio O1A/O1B satisfy the relationship expressed by Formula (2): 2.5≤O1A/O1B≤6.

It is possible to know a trend as to what sort of bonding state that the O contained in the film is present in, by analyzing a result of XPS measurement on a sample having the film containing O.

An XPS spectrum of the sample having the film containing O has a peak O1S attributed to a 1s orbital of O in a binding energy range of 528 eV to 538 eV. This peak O1S can be divided into a peak component $P_{O1}$ present in the binding energy range of 528 eV to 538 eV and a peak component $P_{O2}$ present in a binding energy range of 528 eV to 533 eV by a method described later, in a manner similar to the peak F1S. The peak component $P_{O1}$ is a component attributed to O bonded to the organic atom. Further, the peak component $P_{O2}$ is a component attributed to O bonded to the metal ion.

Furthermore, the peak component $P_{O1}$ can be divided into a peak component $P_{O1A}$ which is a component on a low-binding-energy side and a peak component $P_{O1B}$ which is a component on a high-binding-energy side. The reason for dividing the peak component $P_{O1}$ into these two components is to observe change of shape of the peak component by having O bonded to organic atoms, which have various bonding forms, be represented by these two peak components. Specifically, the peak component can be divided into a peak component $P_{O1A}$ present in a binding energy range of 532±0.5 eV and a peak component $P_{O1B}$ present in a binding energy range of 534±0.5 eV. Incidentally, it is difficult to designate each of the peak components $P_{O1A}$ and $P_{O1B}$ as a specific bonding state of O.

Regarding O contained in the film, O1A is a numerical value expressing the area of the peak component $P_{O1A}$ as a percentage relative to the area of the peak component $P_{O1}$. Regarding O contained in the film, O1B is a numerical value expressing the area of the peak component $P_{O1B}$ as a percentage relative to the area of the peak component $P_{O1}$. Therefore, the ratio O1A/O1B regarding O contained in the film can be obtained by dividing the area of the peak component $P_{O1A}$ by the area of the peak component $P_{O1B}$.

As described above, the peak components $P_{F1}$, $P_{F2}$, $P_{O1A}$, and $P_{O1A}$ have main peaks (peak tops) at the position of 688±0.5 eV, the position of 686±0.5 eV, the position of 532±0.5 eV, and the position of 534±0.5 eV, respectively. Further, half widths of the main peaks are 2.1 eV to 3.2 eV, 2.1 eV to 3.2 eV, 2.3 eV to 2.4 eV, and 2.3 eV to 2.4 eV, respectively.

These peaks can be divided from a peak of a measured spectrum by the following procedure. First, generated is an approximate spectrum with respect to the measured XPS spectrum, with a Gaussian curve:Lorentz curve=90:10. Next, this approximate spectrum is subjected to a fitting process to the measured XPS spectrum to obtain a fitting spectrum. A peak of this fitting spectrum is regarded as superimposition of the above respective peak components, and the intensity of each of the above peak components is allocated. Incidentally, the peak positions and half widths of the peak components $P_{F1}$ and $P_{F2}$ may vary by about ±0.3 eV depending on measurement conditions in some cases. Similarly, the peak positions and half widths of the peak components $P_{O1A}$ and $P_{O1B}$ may vary by about 0.5 eV depending on measurement conditions in some cases.

Incidentally, the peak component $P_{O2}$ may have a main peak at a position of 530.5±0.5 eV. Further, a half width of the main peak may be 2.0 eV to 2.5 eV. Regarding the peak component $P_{O2}$, the peak position and the half width thereof may vary by about 0.3 eV depending on measurement conditions.

The electrode according to the present embodiment desirably further contains aluminum (Al) and nitrogen (N) in the active material-containing layer. In the active material-containing layer, Al and N may be contained as a film present on at least a part of the surface of an active material. Alternatively, Al and N may be contained in the above-described film containing fluorine. Further, an Al component in the film may be present as an alumina component.

When the electrode containing Al and N in the active material-containing layer is used, for example, in a battery such as a lithium ion secondary battery, the side reaction between the electrode and the electrolyte can be further suppressed. Thus, it is possible to promote the effect of suppressing the capacity reduction caused by the SOC deviation when charging and discharging is repeated.

In the active material-containing layer, aluminum is preferably contained in a content ratio of 0.025% by weight to 0.3% by weight relative to the active material contained in the active material-containing layer. In addition, a ratio $A_N/A_{Al}$ between an aluminum component amount (atomic %) $A_{Al}$ and a nitrogen component amount (atomic %) $A_N$ in the active material-containing layer is preferably 0.1 to 4.

Between Al and N contained in the active material-containing layer, the N component contributes more to the effect of suppressing the capacity reduction caused by the SOC deviation. Thus, it is preferable that the ratio $A_N/A_{Al}$ be 0.1 or more. On the other hand, when only the N component is contained in the active material-containing layer, the battery resistance may increase. By allowing the N component and the Al component to coexist, increase in battery resistance can be suppressed. Thus, it is preferable that the ratio $A_N/A_{Al}$ is 4 or less.

The titanium-containing oxide contained in the active material-containing layer may be one or more kinds of compounds.

Examples of the titanium-containing oxide include lithium titanate having a ramsdellite structure (e.g., $Li_{2+y}Ti_3O_7$, $0 \leq y \leq 3$), lithium titanate having a spinel structure (e.g., $Li_{4+x}Ti_5O_{12}$, $0 \leq x \leq 3$), monoclinic titanium dioxide ($TiO_2$), anatase type titanium dioxide, rutile type titanium dioxide, a hollandite type titanium composite oxide, an orthorhombic titanium composite oxide, and a monoclinic niobium titanium composite oxide.

Examples of the orthorhombic titanium-containing composite oxide include a compound represented by $Li_{2+a}M(I)_{2-b}Ti_{6-c}M(II)_dO_{14+\sigma}$. Here, M(I) is at least one selected from the group consisting of Sr, Ba, Ca, Mg, Na, Cs, Rb and K. M(II) is at least one selected from the group consisting of Zr, Sn, V, Nb, Ta, Mo, W, Y, Fe, Co, Cr, Mn, Ni and Al. The respective subscripts in the composition formula are specified as follows: $0 \leq a \leq 6$, $0 \leq b < 2$, $0 \leq c < 6$, $0 \leq d < 6$, and $-0.5 \leq \sigma \leq 0.5$. Specific examples of the orthorhombic titanium-containing composite oxide include $Li_{2+a}Na_2Ti_6O_{14}$ ($0 \leq a \leq 6$).

Examples of the monoclinic niobium titanium composite oxide include a compound represented by $Li_xTi_{1-y}M1_yNb_{2-z}M2_zO_{7+\delta}$. Here, M1 is at least one selected from the group consisting of Zr, Si, and Sn. M2 is at least one selected from the group consisting of V, Ta, and Bi. The respective subscripts in the composition formula are specified as follows: $0 \leq x \leq 5$, $0 \leq y < 1$, $0 \leq z < 2$, and $-0.3 \leq \delta \leq 0.3$. Specific examples of the monoclinic niobium titanium composite oxide include $Li_xNb_2TiO_7$ ($0 \leq x \leq 5$).

Another example of the monoclinic niobium titanium composite oxide is a compound represented by $Ti_{1-y}M3_{y+z}Nb_{2-z}O_{7-\delta}$. Here, M3 is at least one selected from the group consisting of Mg, Fe, Ni, Co, W, Ta, and Mo. The respective subscripts in the composition formula are specified as follows: $0 \leq y < 1$, $0 \leq z \leq 2$, and $-0.3 \leq \delta \leq 0.3$.

The active material-containing layer may optionally contain an electro-conductive agent and a binder.

As the electro-conductive agent, electrically conductive carbon such as carbon black like acetylene black and Ketchen black, graphite, vapor grown carbon fiber (VGCF), carbon nanotube, and the like may be used. Electrical contact between the electrode active materials can be improved by using the electro-conductive agent. In this manner, it is possible to improve discharge rate performance, for example, when the electrode is used in the secondary battery.

A use amount of the electro-conductive agent in the active material-containing layer is set to 0 parts by mass to 20 parts by mass, and preferably 1 part by mass to 10 parts by mass, with respect to 100 parts by mass of the active material. From the viewpoint of suppressing a decrease in energy density of the battery, it is more preferable to set the use amount of the electro-conductive agent to 1 part by mass to 5 parts by mass with respect to 100 parts by mass of the active material.

As the binder, there may be used a solution or a dispersion solution in which binder (polymer) particles having binding properties are dissolved or dispersed in an organic solvent. Hereinafter, these may be collectively referred to as a "binder dispersion solution".

In the case where the binder dispersion solution is a nonaqueous dispersion solution, that is, an organic solvent is used as a dispersion medium, examples of the binder include those obtained by dissolving the following polymer in an organic solvent such as N-methyl-pyrrolidone (NMP): vinyl polymers such as polyethylene (PE), polypropylene (PP), polyisobutylene, polyvinyl chloride, polyvinylidene chloride, polyvinylidene fluoride (PVdF), polytetrafluoroethylene (PTFE), polyvinyl acetate, polyvinyl butyral, polyvinyl isobutyl ether, polyacrylonitrile (PAN), polymethacrylonitrile, polymethyl methacrylate, polymethyl acrylate, polyethyl methacrylate, allyl acetate, and polystyrene; diene polymers such as polybutadiene and polyisoprene; ether polymers containing a hetero atom in a main chain such as polyoxymethylene, polyoxyethylene, polycyclic thioether, and polydimethylsiloxane; condensed ester-based polymers such as polylactone polycyclic anhydrides, polyethylene terephthalate (PET), and polycarbonate; and condensed amide-based polymers such as nylon 6, nylon 66, poly-m-phenylene isophthalamide, poly-p-phenylene terephthalamide, and polypyromellitic imide.

Further, a binder dispersion solution, obtained by using water as the dispersion medium instead of the organic solvent, may also be used as a binder. In this case, a binder suitable for dispersion in water, for example, a water-soluble binder may be used. A cellulose-based member, for example, sodium carboxyl methyl cellulose (CMC), a fluorine rubber, a styrene-butadiene rubber, or the like, may be used as the water-soluble binder, without limitation to the above examples.

A content of the binder in the active material-containing layer is set to 1 part by mass to 10 parts by mass, and preferably 1 part by mass to 8 parts by mass, with respect to 100 parts by mass of the active material. The content of the binder is more desirably 1 part by mass to 5 parts by mass, from the viewpoint of suppressing the decrease in energy density of the battery and preventing the discharge capacity at a high C rate from being impaired.

The electrode according to the present embodiment may further include a current collector. The active material-containing layer may be formed on one surface or both of reverse surfaces of the current collector. Incidentally, the above-described film containing fluorine, organic atoms, and metal ions is present on at least a surface that is not in contact with the current collector out of the surfaces of the active material-containing layer. That is, the film is present on at least a part of the surface of the electrode. Further, the surface of the electrode may be coated with the film (or coating).

There may be used for the current collector, a material which is electrochemically stable at the potential (vs. Li/Li$^+$) at which lithium (Li) is inserted into and extracted from active material. For example, in the case where the active material is used as a negative electrode active material, the current collector is preferably made of copper, nickel, stainless steel, aluminum, or an aluminum alloy including one or more selected from the group consisting of Mg, Ti, Zn, Mn, Fe, Cu, and Si. The thickness of the current collector is preferably from 5 μm to 20 μm. The current collector having such a thickness can maintain balance between the strength and weight reduction of the electrode.

The current collector may include a portion where the active material-containing layer is not formed on a surface of the current collector. This portion may serve as an electrode tab.

The electrode according to the present embodiment may be, for example, an electrode for a secondary battery. The electrode may be a negative electrode. Alternatively, the electrode may be a positive electrode.

[Manufacturing Method]

The electrode according to the present embodiment, that is, the electrode including the active material-containing layer and the film on the surface of the active material-containing layer can be obtained by, for example, assembling a battery unit according to the following procedure and subjecting this unit to aging.

First, a member including the active material-containing layer is prepared by the following procedure.

First, the active material containing the titanium-containing oxide, the electro-conductive agent, and the binder are prepared. Those described above can be used as these materials. However, it is not desirable to use the water-soluble binder as the binder for reasons described later.

Meanwhile, an organoaluminum compound serving as an aluminum source of the alumina component is prepared. For example, aluminum (metal) alkoxide or aluminum chelate (complex) is prepared. As the aluminum alkoxide, for example, di-2-butoxy aluminum ethyl acetoacetate (Al $(C_4H_9O)_2(C_6H_9O_3)$), aluminum tri-2-butoxide (Al(OC$_4$H$_9$)$_3$), di-2-butoxy aluminum acetylacetate (Al(C$_4$H$_9$O)$_2$(C$_5$H$_7$O$_2$)), aluminum secondary butoxide (Al(O-sec-C$_4$H$_9$)$_3$), and the like may be used. As the aluminum chelate, for example, aluminum tris acetylacetate (Al(C$_5$H$_7$O$_2$)$_3$), aluminum bis ethylacetoacetate monoacetyl acetate (Al(C$_5$H$_7$O$_2$)(C$_6$H$_9$O$_3$)$_2$), aluminum tris ethylacetoacetate (Al(C$_6$H$_9$O$_3$)$_3$) may be used. These may be used singly or in a mixture of two or more kinds.

The prepared active material, electro-conductive agent, binder, and the organoaluminum compound (aluminum alkoxide or aluminum chelate) are suspended in an appropriate solvent to prepare a slurry. This slurry is applied onto a current collector such as an aluminum foil at a desired application amount and the applied coat is dried. The surface of the active material can be coated with alumina by preliminarily including a compound serving as an aluminum source in the slurry. Thus, a member including the current collector and the active material-containing layer formed on the current collector is produced. The member obtained is, for example, of a strip shape. The member obtained here will be referred to as a first electrode precursor.

The amount of the organoaluminum compound is desirably adjusted such that a weight of aluminum relative to a weight of the active material is 0.025% by weight to 0.3% by weight. By adjusting the aluminum weight to be 0.025% by weight or more, the above-described effects can be obtained sufficiently. By adjusting the aluminum weight to be 0.3% by weight or less, an increase in battery resistance caused by excessive alumina coating can be suppressed.

When a water-soluble binder (so-called aqueous binder) is used as the binder, water, which would be included as a component in the slurry, is apt to react with residual components of the organoaluminum compound at the time of preparing the slurry. As a result, an excessive alumina coat is formed, which causes an increase in electrical resistance when a battery is produced. In addition, there also are binders used for solvation or dispersion in a nonaqueous solvent (so-called nonaqueous binder), with which viscosity of the slurry increases or the slurry gels upon addition of the organoaluminum compound. For example, when a PVdF binder having a molecular weight of more than 500,000 is used as the binder, the slurry may gel due to a reaction between PVdF and aluminum alkoxide. This makes it difficult to apply the slurry, so attention should be paid thereto. In addition, due to the increase in the viscosity of the slurry, there is more likelihood of occurrence of a problem that accuracy of application amount in an electrode decreases.

Alternatively, the member including the active material-containing layer is produced by the following procedure.

First, the active material containing the titanium-containing oxide, the electro-conductive agent, and the binder are prepared. Those described above may be used as these materials. Next, these materials are suspended in an appropriate solvent to prepare a slurry. This slurry is applied onto a current collector such as an aluminum foil at a desired application amount and the applied coat is dried. When drying the applied coat, for example, it is desirable to perform vacuum drying at 120° C. for 48 hours. Thus, a member including the current collector and the active material-containing layer formed on the current collector is produced. The member obtained is, for example, of a strip shape. The member obtained here will be referred to as an intermediate member. The active material-containing layer of the intermediate member may be subjected to pressing together with the current collector before an alumina coating process described later. Alternatively, the pressing may be performed after the alumina coating process.

Meanwhile, the organoaluminum compound (aluminum alkoxide or aluminum chelate) serving as the aluminum source is dissolved in an appropriate solvent to prepare a diluted solution of the organoaluminum compound. Those described above may be used as the organoaluminum compound. For example, ethanol may be used as the solvent (diluent). In the diluted solution, it is desirable to set a weight ratio (compound:solvent) between the organoaluminum compound and the solvent to be from 1:19 to 1:2. By adjusting the weight ratio to be 1:19 or more, the above-described effect can be sufficiently obtained. By adjusting the weight ratio to be 1:2 or less, it is possible to suppress the increase in battery resistance caused by excess alumina coating.

Next, the intermediate member before or after pressing is immersed in the prepared diluted solution of the organoaluminum compound, and the active material-containing layer is impregnated with the organoaluminum compound solution. The impregnation of the active material-containing layer is desirably performed, for example, by immersing the intermediate member at room temperature for 10 seconds to 30 seconds.

Next, the intermediate member is withdrawn from the organoaluminum compound solution, and the excess solution adhered to the member is wiped away. Subsequently, the intermediate member is subjected to drying. For example, it is desirable to dry the intermediate member on a hot plate set at 120° C., and then, to dry the intermediate member in a vacuum dryer set at 120° C. for 48 hours or more. In this manner, it is possible to obtain a second electrode precursor having the film coat containing the alumina component formed on the active material-containing layer.

The immersion and impregnation described above may also be repeatedly performed.

Each of the above-described procedures, from the immersion of the intermediate member in the organoaluminum compound solution to the drying of the intermediate member, are desirably performed in a low-humidity environment, from the viewpoint of avoiding the excessive alumina component from remaining within the electrode. A desirable environment is an environment having a dew point of −10° C. or less, and a more preferable environment is an environment having a dew point of −40° C. or less. By performing the above procedures in such an environment, it is possible to avoid the increase in battery resistance caused by excessive aluminum that remains on the active material-containing layer.

Although ethanol has been exemplified as a solvent used for dilution of the organoaluminum compound, the diluent is not limited to ethanol. The diluent is preferably a solvent having a relatively low boiling point such that the solvent would not to remain in the electrode after drying, and being a solvent less likely to react with metal alkoxide or an electrode constituent. It is possible to prevent the efficiency from decreasing due to residual solvent at the time of charging and discharging the battery, by using the diluent solvent that does not remain in the electrode. It is desirable to use a solvent having a low water content in order not to react with metal alkoxide or the electrode constituents. In consideration of safety and cost, as well as ease of handling, ethanol may be used suitably. Methanol can be mentioned as another example, but attention should be paid to handling because methanol is toxic.

In the case of adopting the method of immersing the intermediate member in the diluted solution of the organo-aluminum compound (aluminum alkoxide or aluminum chelate), the alumina coating process is performed after preparing the intermediate member, and thus, there is no influence of the binder diluent solvent.

Incidentally, the formation of the film coat on the active material-containing layer can form a film coat having a more uniform thickness as compared with the case of forming a coating on surfaces of particles of the active material. When using the active material having the coating formed on the surface thereof, the coating easily flakes off due to collision between the active material particles, collision with the electro-conductive agent or the like at the time of preparing the slurry so that it is difficult to form a uniform film coat. In addition, breaking of the active material particles may occur at the time of mixing the active material particles with an electrode sub-member (for example, the electro-conductive agent or the binder) in the electrode manufacturing process, so that there is a possibility that an uncoated new surface is generated. In this case, the ratio F2/F1 tends to increase as the number of F bonded to metal ions increases. Meanwhile, the ratio O1A/O1B tends to decrease.

On the other hand, when the above method of obtaining the first electrode precursor or the second electrode precursor is used, a relatively uniform aluminum-containing film coat can be formed.

A counter electrode is produced, in separate. For example, a positive electrode described later may be produced as the counter electrode. In this case, the positive electrode is produced by a method described later.

Further, a separator is prepared. Details of the separator will be described later. The prepared separator is sandwiched between the above-described first electrode precursor and the counter electrode or between the above-described second electrode precursor and the counter electrode to form an electrode group. Specifically, the separator is sandwiched between the alumina film coat of the first electrode precursor or the second electrode precursor and an active material-containing layer of the counter electrode (for example, a positive electrode active material-containing layer described later).

The electrode group may be a stacked type or a wound type. The stacked electrode group is obtained by preparing plural first electrode precursors or plural second electrode precursors, plural counter electrodes, and plural separators, and alternately stacking the first electrode precursor and the counter electrode, or the second electrode precursor and the counter electrode with the separator sandwiched therebetween. The wound electrode group is obtained by winding a stack obtained by stacking the first electrode precursor and the counter electrode with the separator sandwiched therebetween, or a stack obtained by stacking the second electrode precursor and the counter electrode with the separator sandwiched therebetween. The wound structure may be subjected to pressing.

Meanwhile, a container member is prepared. Details of the container member will be described later. The electrode group is placed in the prepared container member and is connected with electrode terminals. For example, a negative electrode terminal is connected to the first electrode precursor or the second electrode precursor, and a positive electrode terminal is connected to the counter electrode. Details of the negative electrode terminal and the positive electrode terminal will be described later.

Next, the electrolyte is prepared. As the electrolyte, for example, a liquid nonaqueous electrolyte described later is prepared. The liquid nonaqueous electrolyte may be prepared by dissolving an isocyanate compound and a later described electrolyte salt as a solute in an organic solvent described later. As the isocyanate compound, for example, ethylene diisocyanate, hexamethylene diisocyanate, dicyclohexylmethane 4,4'-diisocyanate, isophorone diisocyanate, diphenylmethane diisocyanate, toluene diisocyanate, xylylene diisocyanate, tetramethylxylylene diisocyanate, a trimer of ethylene diisocyanate, a trimer of hexamethylene diisocyanate, a trimer of isophorone diisocyanate, and the like may be used.

It is desirable to adjust an addition amount of the isocyanate compound into the electrolyte to 0.1% by weight to 3% by weight. By setting the addition amount of the isocyanate compound to 0.1% by weight or more, the effect of suppressing the capacity reduction of the battery using the obtained electrode can be promoted. By increasing the addition amount, a stable film can be formed, and thereby make the cycle performance of the battery favorable. Further, when the addition amount of the isocyanate compound is increased, the N component amount $A_N$ in the active material-containing layer increases, and thus, there is a tendency that the ratio $A_N/A_{A1}$ increases. On the other hand, the increase in battery resistance can be suppressed by setting the addition amount to 3% by weight or less. The addition amount is preferably 2% by weight or less, more preferably 1.5% by weight or less, and even more preferably 1% by weight or less.

The prepared electrolyte is placed in the container member, and the electrolyte is impregnated (held) in the electrode group. Next, the container member is sealed. In this manner, the battery unit can be obtained.

Next, the battery unit is subjected to initial charge and discharge. Although the procedure of the initial charge is not particularly limited, for example, the battery unit may be subjected to constant current charging with a current value of 0.2 C up to a predetermined voltage, and then, to constant voltage charging at that voltage until the total charging time reaches 10 hours (CC-CV mode). During the initial discharge, for example, the battery unit that has been initially charged is subjected to constant current discharging with a current value of 0.2 C to a predetermined voltage (CC mode).

Next, the battery unit after initial charge and discharge is adjusted to a state of charge (SOC) of from 20% to 100%. The SOC here is obtained by assuming the discharge capacity at the time of charging and discharging the battery unit within a recommended voltage as 1 C and expressing in percentage, a ratio of a charge amount of the battery unit at the time of charging the battery unit with a current value of 0.2 C to 1 C from a recommended discharged state relative to the previous 1C discharge capacity. For example, when the charge amount of the battery unit is 30% of the aforementioned 1C discharge capacity, the battery unit is assumed to be in the state of having SOC of 30%.

Next, the battery unit whose SOC has been adjusted is held in a thermostat kept at a temperature of, for example, from 60° C. to 100° C. This process is called aging. With this aging, the film coat with which the surface of the first electrode precursor or the second electrode precursor is coated can be converted into a film containing F and having a ratio F2/F1 of 0.1 or more and less than 0.6. That is, the first electrode precursor or the second electrode precursor can be converted into the electrode according to the present embodiment by the aging.

The retention time (aging time) is set to be, for example, 5 hours to 100 hours. The retention time is more preferably 20 hours or more.

When the aging is processed at a relatively low temperature, for example, 60° C. or higher and lower than 70° C., the SOC of the battery unit is increased, for example, adjusted to 70% to 100%, and aging is performed for a long time, for example, 48 hours to 100 hours. In the case of performing aging treatment at a relatively high temperature, for example, 70° C. to 100° C., the SOC is decreased, for example, adjusted to 20% to 40%, and aging is performed for a short time, for example, 10 hours to 40 hours. When the temperature condition, the SOC of the battery unit, and the processing time are appropriately combined in this manner, an increase in battery resistance due to aging can be suppressed. Further, aging may be performed plural times, upon which, aging at low temperature and aging at high temperature may be combined. In this manner, it is possible to suppress the increase in battery resistance while forming a strong film. For example, aging performed at 80° C. for 24 hours with adjusted SOC of 20% and aging performed at 65° C. for 80 hours with adjusted SOC of 90% may both be performed for the same battery unit.

A desirable aging temperature is from 65° C. to 85° C. In addition, it is desirable to adjust the SOC of the battery unit to be 20% to 90% at the time of aging. When aging is performed under such a desirable temperature condition or SOC state, it is possible to form the film containing the Al component and the N component, which can promote suppression of the SOC deviation.

When an addition concentration of the isocyanate compound is high, the formation of the film on the active material is promoted. Further, the formation of the film is promoted also when the aging temperature is high. The formation of the film is promoted also when aging is performed in a state where the SOC of the battery unit is high. Further, the formation of the film on the active material is promoted when the aging treatment is carried out for a long time. In any case, there is a tendency that F2/F1 decreases. On the other hand, there is a tendency that the ratio $A_N/A_{A1}$ increases when the aging treatment time is long.

However, if the aging treatment is excessively performed or the addition amount of the isocyanate compound is excessively increased, this leads to the increase in battery resistance, which is undesirable. Although the increase in battery resistance is suppressed by combining the addition of the isocyanate compound with alumina coating, attention should be paid to keep a balance between the amount of alumina and the concentration of the isocyanate compound. Incidentally, Al that may be contained in the active material-containing layer may be contained as the alumina component. Further, N that may be contained in the active material-containing layer may be derived from the isocyanate compound. Therefore, adjustment of the balance between the alumina amount and the isocyanate compound concentration leads to control of the ratio $A_N/A_{A1}$.

The aging may be carried out continuously or intermittently. After the aging, gas generated in the battery can be removed by unsealing the battery if necessary. After degassing, vacuuming may be performed, optionally.

With the above procedure, the battery including the electrode according to the present embodiment can be obtained. The obtained battery may be directly used, as is. When degassing has been performed, the battery is sealed again after degassing. Alternatively, the obtained battery may be disassembled to take out the electrode. When taken out from the battery, the electrode according to the present embodiment can be obtained independently.

[Various Measurement Methods]

Hereinafter, various measurement methods will be described for determining whether an electrode to be investigated is the electrode according to the present embodiment. Further, various measurement methods will be described for determining whether a battery to be investigated includes the electrode according to the present embodiment.

<X-Ray Photoelectron Spectroscopy (XPS) Measurement>

X-ray photoelectron spectroscopy (XPS) measurement is performed on an electrode set to a discharged state by the following procedure. Here, in the case of a battery, the discharged state means a state after discharging is performed according to recommended charge and discharge specification of the battery. However, the discharged state of the battery here includes a state where the SOC of the battery is 0% to 30%. When setting the battery to the discharged state, an unused battery is used.

Regarding an electrode that is included in a battery other than the unused battery, the electrode is taken out from the battery according to the following procedure, and the taken-out electrode is subjected to discharging. Incidentally, an electrode included in the unused battery may also be taken out from the battery and subjected to discharging. First, a battery to be measured is disassembled in a glove box filled with argon. An electrode is taken out from the disassembled battery. When taking out the electrode, attention should be paid such that the target electrode and a counter electrode (for example, a negative electrode and a positive electrode) do not come into contact. Next, the taken-out electrode is washed with, for example, a linear carbonate solvent such as methyl ethyl carbonate to remove the Li salt and the like. Next, the washed electrode is dried.

Next, the dried electrode is used as a working electrode, and lithium metal is used as the counter electrode and a reference electrode to produce a three-electrode electrochemical cell. Here, an electrolyte of the three-electrode electrochemical cell is not particularly limited, but a solution, obtained by dissolving 1 mol/L of lithium hexafluorophosphate ($LiPF_6$) in a mixed solvent of ethylene carbonate and methyl ethyl carbonate having a volume ratio of 1:1, for example, may be used.

The three-electrode electrochemical cell thus prepared is charged until a potential of the working electrode reaches 3.0 V (vs. $Li/Li^+$). Thereafter, this cell is discharged until the potential of the working electrode reaches 1.4 V (vs. $Li/Li^+$), and an electric capacity C [mAh] at this time is measured. Next, charging is performed until the potential of the working electrode reaches a potential of from 2.0 V (vs. $Li/Li^+$) to 2.5 V (vs. $Li/Li^+$). Incidentally, a current value of the current flowing at the time of adjusting the SOC is set to a value of from 0.1 C to 1 C. Thus, the electrode can be set to the discharged state.

The electrode in the discharged state set by the above procedure is subjected to XPS measurement according to, for example, the procedure described hereinafter. As an apparatus used for this measurement, ESCA 300 manufactured by SCIENTA Omicron, Inc. or an apparatus having a function equivalent thereto can be used. Single crystal spectral Al-Kα rays (1486.6 eV) are used as an excitation X-ray source. An X-ray output is set to 4 kW (13 kV×310 mA), a photoelectron detection angle is set to 90°, and an analysis region is set to about 4 mm×0.2 mm.

First, the electrode set to the discharged state according to any of the above-described procedures is taken out from the battery to be investigated or the three-electrode electrochemical cell in an argon atmosphere. Next, the taken-out electrode is washed with, for example, methyl ethyl carbonate to remove Li salt adhered to the electrode surface. The electrode from which Li salt has been removed is dried, and then, mounted to a sample holder. The sample is carried in an inert atmosphere, for example, under a nitrogen atmosphere. XPS measurement is performed on the mounted sample. Scanning is performed at 0.10 eV/step.

The film containing F, organic atoms, and metal ions is positioned among the surfaces of the active material-containing layer, at least on a surface that does not face the current collector, that is, on the surface of the electrode. Thus, it is possible to obtain information regarding the film by performing the XPS measurement of the surface of the electrode.

The obtained XPS spectrum is used as a measured spectrum and divided into each peak component as described above, whereby the value of F2/F1 and the value of O1A/O1B can be obtained.

Further, the ratio $A_N/A_{A1}$ of the Al component amount $A_{A1}$ (atomic %) and the N component amount $A_N$ (atomic %) in the active material-containing layer is obtained from the XPS spectrum.

<Inductively Coupled Plasma Atomic Emission Spectrometry>

The aluminum content with respect to the active material can be calculated by analyzing with inductively coupled plasma atomic emission spectrometry (ICP-AES).

Specifically, an active material-containing layer to be measured is removed from the electrode current collector with an aqueous solvent or NMP, and a dispersion solution is prepared by dispersing the electrode components in a solvent. A solid component is extracted from this dispersion solution and collected. A melt obtained from the solid component using an acid decomposition method or an alkali fusion method is dissolved in an acidic aqueous solution. In the acid decomposition method, an appropriate acid and the solid component are placed in a pressurized vessel and heated to dissolve the solid component in the acid. In this manner, a sample solution containing electrode constituents is obtained. Incidentally, the electrode constituents may mainly contain a metal component forming the active material-containing layer.

Quantitative analysis is performed on the sample solution by an ICP analysis method. A composition of an active material is obtained based on results of the analysis. Further, a content of aluminum relative to the active material is calculated based on the active material composition and analytic values of at least one of constituents of the active material, for example, Ti and Al.

<Transmission Electron Microscope and Energy Dispersive X-Ray Spectroscopy (TEM-EDX) Observation>

It is possible to examine whether Al is contained in the film positioned on the surface of the active material-contained in the active material-containing layer by observing an electrode, for example, using an energy dispersive X-ray spectrometer (EDX) attached to a transmission electron microscope (TEM) (TEM-EDX).

The electrode to be measured may be prepared by taking out the electrode from the battery set to the discharged state or discharging the electrode taken out from the battery by the above-described procedure.

As the TEM, for example, a transmission electron microscope (H9000 UHR III manufactured by Hitachi, Ltd.) can be used. An acceleration voltage can be set to 300 kV, for example.

In the TEM-EDX observation, when element analysis is performed by irradiating an active material particle from a center portion to an end portion (edge portion) with electron beams, it may be examined from the intensity of an observed Al peak that the amount of Al components gradually increase from the center of the active material particle to the end portion (outer periphery). In this case, it can be determined that the film containing Al is positioned on the surface of the active material particle.

<X-Ray Diffraction (XRD) Measurement of Electrode>

A crystal structure of the active material contained in the electrode can be examined by powder X-ray diffraction (XRD) measurement.

The XRD measurement on the electrode can be performed by cutting out the electrode to be measured to about the same size as the area of a holder of a wide angle X-ray diffractometer and directly attaching the cut electrode to the glass holder. At this time, XRD is measured in advance in accordance with a type of the metal foil of the electrode current collector to take note of at which position a peak derived from the current collector appears. Further, the presence or absence of a peak of mixed substances such as the electro-conductive agent and the binder is also taken note of in advance. When the peak of the current collector and the peak of the active material overlap, it is desirable to perform measurement with the active material detached from the current collector. This is for separation of overlapping peaks when quantitatively measuring the peak intensity. It is a matter of course that this operation can be omitted if these peaks can be taken into consideration in advance. Although the electrode active material may be physically detached, it is easy to remove the electrode active material by applying ultrasonic waves in a solvent. Wide angle X-ray diffraction measurement of the active material can be performed by measuring the electrode active material collected in this manner.

As an apparatus for the powder X-ray diffraction measurement, for example, SmartLab manufactured by Rigaku Corporation is used. Measurement conditions are as follows: X-ray source: Cu target; output: 45 kV, 200 mA; soller slit: 5° for both incidence and reception; step width: 0.02 deg; scan rate: 20 deg/min; semiconductor detector: D/teX Ultra 250; sample plate holder: a flat glass sample holder (thickness of 0.5 mm); measurement range: $5°≤2θ≤90°$. When using other apparatuses, prior measurement is performed using standard Si powder for powder X-ray diffraction in order to adjust measurement conditions such that peak intensities and peak top positions coincide with those of the above apparatus, so as to obtain measurement results equivalent to those described above.

In the powder X-ray diffraction measurement, a value of a scattering angle 2θ is obtained from a position of a diffraction peak obtained by the XRD measurement, a crystal spacing d is calculated by the Bragg's law, and a crystal structure (crystal system) can be specified by analysis.

<Method for Measuring BET Specific Surface Area of Active Material>

A BET specific surface area of the active material can be measured, for example, by a method described hereinafter.

First, the electrode containing the active material to be measured is taken out from the battery and washed according to the above-described procedure if necessary.

Subsequently, a part of the washed electrode is placed in an appropriate solvent and irradiated with ultrasonic waves. For example, the electrode is placed in methyl ethyl carbonate placed in a glass beaker, and the beaker is vibrated in an ultrasonic washer, whereby the active material-containing layer can be removed from the current collector. Next, drying under reduced pressure is performed to dry the removed active material-containing layer. The obtained active material-containing layer is pulverized with a mortar or the like to obtain a powder containing the negative electrode active material, the electro-conductive agent, the binder, components of the film, and the like. Subsequently, the active material can be separated from the electro-conductive agent and the like by subjecting this powder to a centrifugal separator. Thus, a powder of the active material can be extracted. This active material powder is used as a measurement sample.

A mass of the active material is set to 4 g. As the evaluation cell, for example, ½ inch cell is used. As a pretreatment method, degassing treatment is carried out by drying the evaluation cell under reduced pressure at a temperature of about 100° C. or higher for 15 hours. As a measurement apparatus, for example, Tristar II 3020 manufactured by Shimadzu Corporation and Micromeritics Corporation is used. A nitrogen gas is adsorbed while changing the pressure, and an adsorption isotherm with a relative pressure on the horizontal axis and an $N_2$ gas adsorption on the vertical axis is obtained. Assuming that this curve follows the BET theory, the specific surface area of the powder of the active material can be calculated by applying the BET equation.

The electrode according to the first embodiment includes the active material-containing layer and the film on at least a part of the surface of the active material-containing layer, the active material-containing layer containing the active material that contains the titanium-containing oxide. The film contains fluorine, organic atoms and metal ions. Part of the fluorine is bonded to the above-described organic atoms, and another part of the fluorine is bonded to the above-described metal ions. The film satisfies Formula (1): $0.1 \leq F2/F1 \leq 0.6$. In Formula (1), F1 is the proportion of fluorine bonded to the organic atoms, and F2 is the proportion of fluorine bonded to the metal ions. With this configuration, the electrode according to the first embodiment can realize the secondary battery exhibiting excellent output performance and excellent cycle life performance.

Second Embodiment

According to a second embodiment, there is provided a secondary battery including a negative electrode, a positive electrode, and an electrolyte. As the negative electrode, the secondary battery includes the electrode according to the first embodiment.

The secondary battery according to the second embodiment may further include a separator provided between the positive electrode and the negative electrode. The negative electrode, the positive electrode, and the separator can structure an electrode group. The electrolyte may be held in the electrode group.

The secondary battery according to the second embodiment may further include a container member that houses the electrode group and the electrolyte.

The secondary battery according to the second embodiment may further include a negative electrode terminal electrically connected to the negative electrode and a positive electrode terminal electrically connected to the positive electrode.

The secondary battery according to the second embodiment may be, for example, a lithium secondary battery. The secondary battery also includes nonaqueous electrolyte secondary batteries containing nonaqueous electrolyte(s).

Hereinafter, the negative electrode, the positive electrode, the electrolyte, the separator, the container member, the negative electrode terminal, and the positive electrode terminal will be described in detail.

1) Negative Electrode

The negative electrode may include a negative electrode current collector and a negative electrode active material-containing layer. The negative electrode current collector and the negative electrode active material-containing layer may respectively be a current collector and an active material-containing layer that may be included in the electrode according to the first embodiment.

Of the details of the negative electrode, parts overlapping with the details described in the first embodiment are omitted.

The density of the negative electrode active material-containing layer (excluding the current collector) is preferably from 1.8 g/cm³ to 2.8 g/cm³. The negative electrode, in which the density of the negative electrode active material-containing layer is within this range, is excellent in energy density and ability to hold the electrolyte. The density of the negative electrode active material-containing layer is more preferably from 2.1 g/cm³ to 2.6 g/cm³.

The negative electrode may be produced by a method similar to that for the electrode according to the first embodiment, for example.

2) Positive Electrode

The positive electrode may include a positive electrode current collector and a positive electrode active material-containing layer. The positive electrode active material-containing layer may be formed on one surface or both of reverse surfaces of the positive electrode current collector. The positive electrode active material-containing layer may include a positive electrode active material, and optionally an electro-conductive agent and a binder.

As the positive electrode active material, for example, an oxide or a sulfide may be used. The positive electrode may singly include one kind of compound as the positive electrode active material, or alternatively, include two or more kinds of compounds in combination. Examples of the oxide and sulfide include compounds capable of having Li and Li ions be inserted and extracted.

Examples of such compounds include manganese dioxides ($MnO_2$), iron oxides, copper oxides, nickel oxides, lithium manganese composite oxides (e.g., $Li_xMn_2O_4$ or $Li_xMnO_2$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$, $0<y<1$), lithium manganese cobalt composite oxides (e.g., $Li_xMn_yCo_{1-y}O_2$; $0<x\leq1$, $0<y<1$), lithium manganese nickel composite oxides having a spinel structure (e.g., $Li_xMn_{2-y}Ni_yO_4$; $0<x\leq1$, $0<y<2$), lithium phosphates having an olivine structure (e.g., $Li_xFePO_4$; $0<x\le1$, $Li_xFe_{1-y}Mn_yPO_4$; $0<x\le1$, $0<y<1$, and $Li_xCoPO_4$; $0<x\le1$), iron sulfates [$Fe_2(SO_4)_3$], vanadium oxides (e.g., $V_2O_5$), and lithium nickel cobalt manganese composite oxides ($Li_xNi_{1-y-z}Co_yMn_zO_2$; $0<x\le1$, $0<y<1$, $0<z<1$, $y+z<1$).

Among the above, examples of compounds more preferable as the positive electrode active material include lithium manganese composite oxides having a spinel structure (e.g., $Li_xMn_2O_4$; $0<x\le1$), lithium nickel composite oxides (e.g., $Li_xNiO_2$; $0<x\le1$), lithium cobalt composite oxides (e.g., $Li_xCoO_2$; $0<x\le1$), lithium nickel cobalt composite oxides (e.g., $Li_xNi_{1-y}Co_yO_2$; $0<x\le1$, $0<y<1$), lithium manganese nickel composite oxides having a spinel structure (e.g., $Li_xMn_{2-y}Ni_yO_4$; $0<x\le1$, $0<y<2$), lithium manganese cobalt composite oxides (e.g., $Li_xMn_yCo_{1-y}O_2$; $0<x\le1$, $0<y<1$), lithium iron phosphates (e.g., $Li_xFePO_4$; $0\le x\le1$), and lithium nickel cobalt manganese composite oxides ($Li_xNi_{1-y-z}Co_yMn_zO_2$; $0<x\le1$, $0<y<1$, $0<z<1$, $y+z<1$). The positive electrode potential can be made high by using these positive electrode active materials.

When a room temperature molten salt is used as the electrolyte of the battery, it is preferable to use a positive electrode active material including lithium iron phosphate, $Li_xVPO_4F$ ($0\le x\le1$), lithium manganese composite oxide, lithium nickel composite oxide, lithium nickel cobalt composite oxide, or a mixture thereof. Since these compounds have low reactivity with room temperature molten salts, cycle life can be improved. Details regarding the room temperature molten salt are described later.

The primary particle size of the positive electrode active material is preferably from 100 nm to 1 μm. The positive electrode active material having a primary particle size of 100 nm or more is easy to handle during industrial production. In the positive electrode active material having a primary particle size of 1 μm or less, diffusion of lithium ions within solid can proceed smoothly.

The specific surface area of the positive electrode active material is preferably from 0.1 $m^2/g$ to 10 $m^2/g$. The positive electrode active material having a specific surface area of 0.1 $m^2/g$ or more can secure sufficient sites for inserting and extracting Li ions. The positive electrode active material having a specific surface area of 10 $m^2/g$ or less is easy to handle during industrial production, and can secure a good charge and discharge cycle performance.

The binder is added to fill gaps among the dispersed positive electrode active material and also to bind the positive electrode active material with the positive electrode current collector. Examples of the binder include polytetrafluoroethylene (PTFE), polyvinylidene fluoride (PVdF), fluorine rubber, polyacrylate compounds, imide compounds, carboxyl methylcellulose (CMC), and salts of CMC. One of these may be used as the binder, or two or more may be used in combination as the binder.

The electro-conductive agent is added to improve current collection performance and to suppress the contact resistance between the positive electrode active material and the positive electrode current collector. Examples of the electro-conductive agent include carbonaceous substances such as vapor grown carbon fiber (VGCF), carbon black such as acetylene black, and graphite. One of these may be used as the electro-conductive agent, or two or more may be used in combination as the electro-conductive agent. The electro-conductive agent may be omitted.

In the positive electrode active material-containing layer, the positive electrode active material and binder are preferably blended in proportions of 80% by mass to 98% by mass, and 2% by mass to 20% by mass, respectively.

When the amount of the binder is 2% by mass or more, sufficient electrode strength can be achieved. The binder may serve as an electrical insulator. Thus, when the amount of the binder is 20% by mass or less, the amount of insulator in the electrode is reduced, and thereby the internal resistance can be decreased.

When an electro-conductive agent is added, the positive electrode active material, binder, and electro-conductive agent are preferably blended in proportions of 77% by mass to 95% by mass, 2% by mass to 20% by mass, and 3% by mass to 15% by mass, respectively.

When the amount of the electro-conductive agent is 3% by mass or more, the above-described effects can be expressed. By setting the amount of the electro-conductive agent to 15% by mass or less, the proportion of electro-conductive agent that contacts the electrolyte can be made low. When this proportion is low, the deterioration of the electrolyte can be reduced during storage under high temperatures.

The positive electrode current collector is preferably an aluminum foil, or an aluminum alloy foil containing one or more selected from the group consisting of Mg, Ti, Zn, Ni, Cr, Mn, Fe, Cu, and Si.

The thickness of the aluminum foil or aluminum alloy foil is preferably from 5 μm to 20 μm, and more preferably 15 μm or less. The purity of the aluminum foil is preferably 99% by mass or more. The amount of transition metal such as iron, copper, nickel, or chromium contained in the aluminum foil or aluminum alloy foil is preferably 1% by mass or less.

The positive electrode current collector may include a portion where a positive electrode active material-containing layer is not formed on a surface of the positive electrode current collector. This portion may serve as a positive electrode tab.

The positive electrode may be produced by the following method, for example. First, positive electrode active material, electro-conductive agent, and binder are suspended in a solvent to prepare a slurry. The slurry is applied onto one surface or both of reverse surfaces of a positive electrode current collector. Next, the applied slurry is dried to form a layered stack of active material-containing layer(s) and current collector. Then, the layered stack is subjected to pressing. The positive electrode can be produced in this manner.

Alternatively, the positive electrode may also be produced by the following method. First, positive active material, electro-conductive agent, and binder are mixed to obtain a mixture. Next, the mixture is formed into pellets. Then the positive electrode can be obtained by arranging the pellets on the positive electrode current collector.

3) Electrolyte

As the electrolyte, for example, a liquid nonaqueous electrolyte or gel nonaqueous electrolyte may be used. The liquid nonaqueous electrolyte is prepared by dissolving an electrolyte salt as solute in an organic solvent. The liquid nonaqueous electrolyte may further contain the above-described isocyanate compound. The term "liquid nonaqueous electrolyte" used herein refers to a nonaqueous electrolyte that is liquid at room temperature (for example, 20° C.) and 1 atm. The concentration of electrolyte salt is preferably from 1 mol/L to 3 mol/L, and more preferably from 0.5 mol/L to 2.5 mol/L.

Examples of the electrolyte salt include lithium salt such as lithium perchlorate ($LiClO_4$), lithium hexafluorophosphate (LiPF$_6$), lithium tetrafluoroborate (LiBF$_4$), lithium arsenic hexafluoride (LiAsF$_6$), lithium antimony hexafluoride (LiSbF$_6$), lithium trifluoromethanesulfonate (LiCF$_3$SO$_3$), bis trifluoromethyl sulfonyl imide lithium [LiN(CF$_3$SO$_2$)$_2$], lithium bis pentafluoroethanesulfonylimide [Li(C$_2$F$_5$SO$_2$)$_2$N], lithium bisoxalate borate [LiB(C$_2$O$_4$)$_2$], and lithium difluoro (trifluoro-2-oxido-2-trifluoro-methylpropionate (2-)-0,0) borate [LiBF$_2$(OCOOC(CF$_3$)$_2$)], and mixtures thereof. The electrolyte salt is preferably resistant to oxidation even at a high potential, and most preferably LiBF$_4$ or LiPF$_6$.

Examples of the organic solvent include cyclic carbonates such as propylene carbonate (PC), ethylene carbonate (EC), or vinylene carbonate (VC); linear carbonates such as diethyl carbonate (DEC), dimethyl carbonate (DMC), or methyl ethyl carbonate (MEC); cyclic ethers such as tetrahydrofuran (THF), 2-methyl tetrahydrofuran (2-NeTHF), or dioxolane (DOX); linear ethers such as dimethoxy ethane (DME) or diethoxy ethane (DEE); γ-butyrolactone (GBL), acetonitrile (AN), and sulfolane (SL). These organic solvents may be used singularly or as a mixed solvent.

The gel nonaqueous electrolyte is prepared by obtaining a composite of a liquid nonaqueous electrolyte and a polymeric material. Examples of the polymeric material include polyvinylidene fluoride (PVdF), polyacrylonitrile (PAN), polyethylene oxide (PEO), and mixtures thereof.

Alternatively, other than the liquid nonaqueous electrolyte and gel nonaqueous electrolyte, a room temperature molten salt (ionic melt) containing lithium ions, a polymer solid electrolyte, an inorganic solid electrolyte, or the like may be used as the nonaqueous electrolyte.

The room temperature molten salt (ionic melt) indicates compounds among organic salts made of combinations of organic cations and anions, compounds that are able to exist in a liquid state at room temperature (15° C. to 25° C.). The room temperature molten salt includes a room temperature molten salt which exists alone as a liquid, a room temperature molten salt which becomes a liquid upon mixing with an electrolyte salt, a room temperature molten salt which becomes a liquid when dissolved in an organic solvent, and mixtures thereof. In general, the melting point of the room temperature molten salt used in secondary batteries is 25° C. or below. The organic cations generally have a quaternary ammonium framework.

The polymer solid electrolyte is prepared by dissolving the electrolyte salt in a polymeric material, and solidifying it.

The inorganic solid electrolyte is a solid substance having Li ion conductivity.

4) Separator

The separator may be made of, for example, a porous film or synthetic resin nonwoven fabric including polyethylene (PE), polypropylene (PP), cellulose, or polyvinylidene fluoride (PVdF). In view of safety, a porous film made of polyethylene or polypropylene is preferred. This is because such a porous film melts at a fixed temperature and thus able to shut off current.

5) Container Member

As the container member, for example, a container made of laminate film or a container made of metal may be used.

The thickness of the laminate film is, for example, 0.5 mm or less, and preferably 0.2 mm or less.

As the laminate film, used is a multilayer film including multiple resin layers and a metal layer sandwiched between the resin layers. The resin layer may include, for example, a polymeric material such as polypropylene (PP), polyethylene (PE), nylon, or polyethylene terephthalate (PET). The metal layer is preferably made of aluminum foil or an aluminum alloy foil, so as to reduce weight. The laminate film may be formed into the shape of a container member, by heat-sealing.

The wall thickness of the metal container is, for example, 1 mm or less, more preferably 0.5 mm or less, and still more preferably 0.2 mm or less.

The metal case is made, for example, of aluminum or an aluminum alloy. The aluminum alloy preferably contains elements such as magnesium, zinc, or silicon. If the aluminum alloy contains a transition metal such as iron, copper, nickel, or chromium, the content thereof is preferably 100 ppm by mass or less.

The shape of the container member is not particularly limited. The shape of the container member may be, for example, flat (thin), square, cylinder, coin, or button-shaped. The container member may be appropriately selected depending on battery size and use of the battery.

6) Negative Electrode Terminal

The negative electrode terminal may be made of a material that is electrochemically stable at the potential at which Li is inserted into and extracted from the above-described negative electrode active material, and has electrical conductivity. Specific examples of the material for the negative electrode terminal include copper, nickel, stainless steel, aluminum, and aluminum alloy containing at least one element selected from the group consisting of Mg, Ti, Zn, Mn, Fe, Cu, and Si. Aluminum or aluminum alloy is preferred as the material for the negative electrode terminal. The negative electrode terminal is preferably made of the same material as the negative electrode current collector, in order to reduce the contact resistance with the negative electrode current collector.

7) Positive Electrode Terminal

The positive electrode terminal may be made of, for example, a material that is electrically stable in the potential range of 3 V to 4.5 V (vs. Li/Li$^+$) relative to the redox potential of lithium, and has electrical conductivity. Examples of the material for the positive electrode terminal include aluminum and an aluminum alloy containing one or more selected from the group consisting of Mg, Ti, Zn, Mn, Fe, Cu, and Si. The positive electrode terminal is preferably made of the same material as the positive electrode current collector, in order to reduce contact resistance with the positive electrode current collector.

Next, the secondary battery according to the second embodiment will be more specifically described with reference to the drawings.

Figure 2:
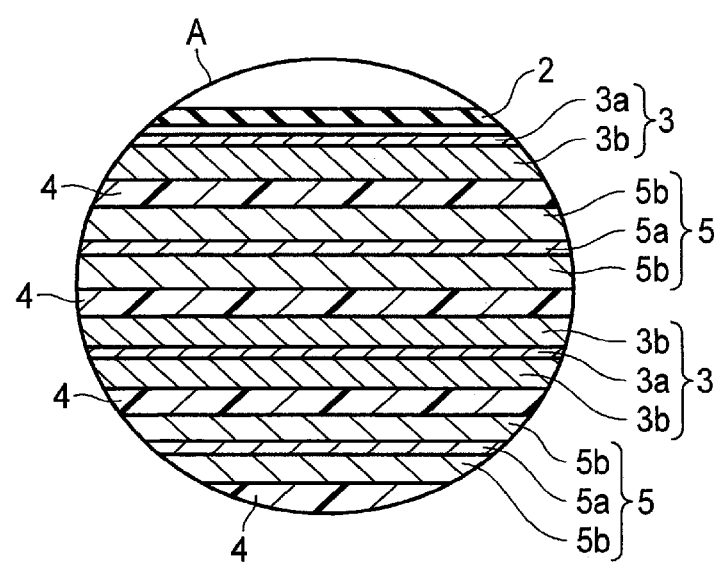
FIG. 2 is an enlarged cross-sectional view of section A of the secondary battery shown in FIG. 1.

FIG. 1 is a cross-sectional view schematically showing an example of a secondary battery according to the second embodiment. FIG. 2 is an enlarged cross-sectional view of section A of the secondary battery shown in FIG. 1.

The secondary battery 100 shown in FIGS. 1 and 2 includes a bag-shaped container member 2 shown in FIG. 1, an electrode group 1 shown in FIGS. 1 and 2, and an electrolyte, which is not shown. The electrode group 1 and the electrolyte are housed in the bag-shaped container member 2. The electrolyte (not shown) is held in the electrode group 1.

The bag-shaped container member 2 is made of a laminate film including two resin layers and a metal layer sandwiched between the resin layers.

As shown in FIG. 1, the electrode group 1 is a wound electrode group in a flat form. The wound electrode group 1 in a flat form includes a negative electrode 3, a separator 4, and a positive electrode 5, as shown in FIG. 2. The separator 4 is sandwiched between the negative electrode 3 and the positive electrode 5.

The negative electrode 3 includes a negative electrode current collector 3a and a negative electrode active material-containing layer 3b. At the portion of the negative electrode 3 positioned outermost among the wound electrode group 1, the negative electrode active material-containing layer 3b is formed only on an inner surface of the negative electrode current collector 3a, as shown in FIG. 2. For the other portions of the negative electrode 3, negative electrode active material-containing layers 3b are formed on both of reverse surfaces of the negative electrode current collector 3a.

The positive electrode 5 includes a positive electrode current collector 5a and positive electrode active material-containing layers 5b formed on both of reverse surfaces of the positive electrode current collector 5a.

As shown in FIG. 1, a negative electrode terminal 6 and positive electrode terminal 7 are positioned in vicinity of the outer peripheral edge of the wound electrode group 1. The negative electrode terminal 6 is connected to a portion of the negative electrode current collector 3a positioned outermost. The positive electrode terminal 7 is connected to a portion of the positive electrode current collector Sa positioned outermost. The negative electrode terminal 6 and the positive electrode terminal 7 extend out from an opening of the bag-shaped container member 2. A thermoplastic resin layer is provided on the inner surface of the bag-shaped container member 2, and the opening is sealed by heat-sealing the resin layer.

Figure 4:
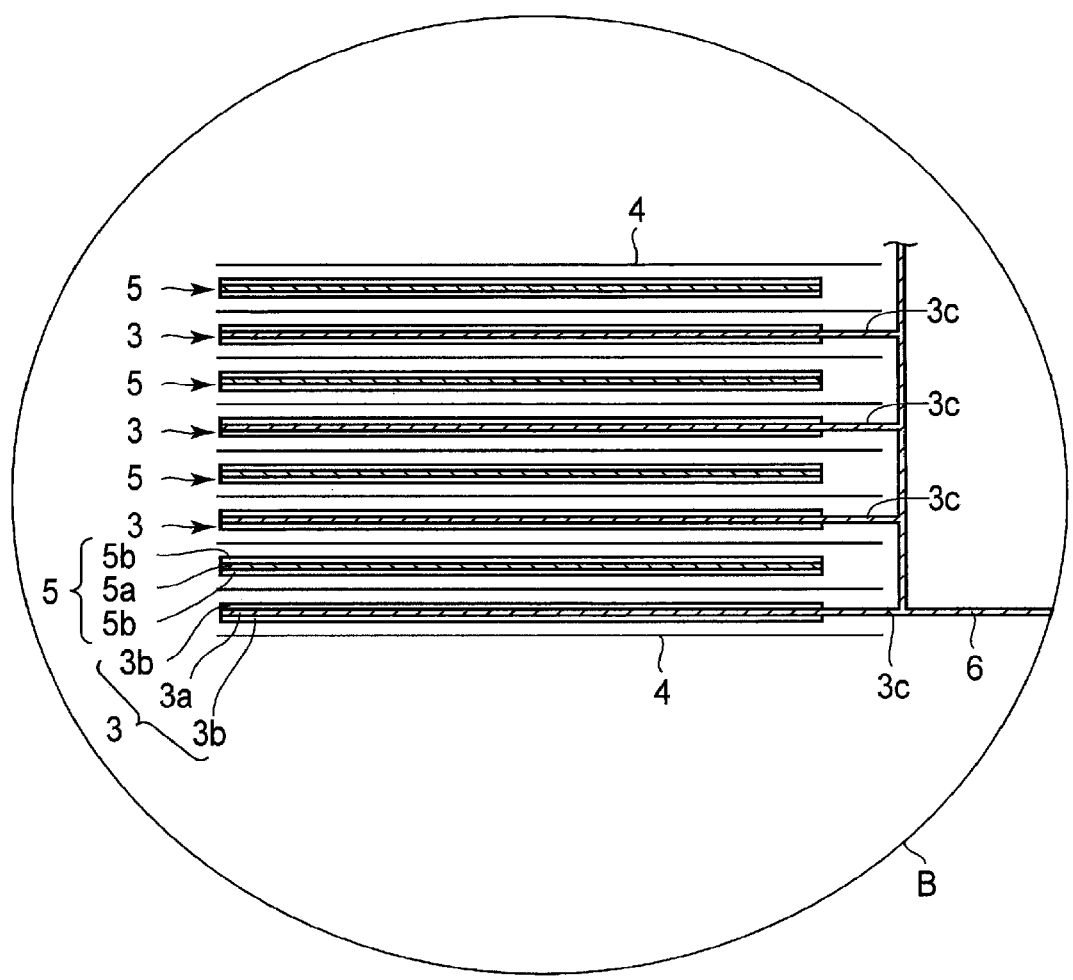
FIG. 4 is an enlarged cross-sectional view of section B of the secondary battery shown in FIG. 3.

The secondary battery according to the second embodiment is not limited to the secondary battery of the structure shown in FIGS. 1 and 2, and may be, for example, a battery of a structure as shown in FIGS. 3 and 4.

FIG. 3 is a partially cutout perspective view schematically showing another example of a secondary battery according to the second embodiment. FIG. 4 is an enlarged cross-sectional view of section B of the secondary battery shown in FIG. 3.

The secondary battery 100 shown in FIGS. 3 and 4 includes an electrode group 1 shown in FIGS. 3 and 4, a container member 2 shown in FIG. 3, and an electrolyte, which is not shown. The electrode group 1 and the electrolyte are housed in the container member 2. The electrolyte is held in the electrode group 1.

The container member 2 is made of a laminate film including two resin layers and a metal layer sandwiched between the resin layers.

As shown in FIG. 4, the electrode group 1 is a stacked electrode group. The stacked electrode group 1 has a structure in which and negative electrodes 3 and positive electrodes 5 are alternately stacked with separator(s) 4 sandwiched therebetween.

The electrode group 1 includes plural negative electrodes 3. Each of the negative electrodes 3 includes the negative electrode current collector 3a and the negative electrode active material-containing layers 3b supported on both surfaces of the negative electrode current collector 3a. The electrode group 1 further includes plural positive electrodes 5. Each of the positive electrodes 5 includes the positive electrode current collector 5a and the positive electrode active material containing layers 5b supported on both surfaces of the positive electrode current collector 5a.

The negative electrode current collector 3a of each of the negative electrodes 3 includes at one end, a portion 3c where the negative electrode active material-containing layer 3b is not supported on either surface. This portion 3c serves as a negative electrode tab. As shown in FIG. 4, the portions 3c serving as the negative electrode tabs do not overlap the positive electrodes 5. The plural negative electrode tabs (portions 3c) are electrically connected to the strip-shaped negative electrode terminal 6. A tip of the strip-shaped negative electrode terminal 6 is drawn to the outside from the container member 2.

Although not shown, the positive electrode current collector 5a of each of the positive electrodes 5 includes at one end, a portion where the positive electrode active material-containing layer 5b is not supported on either surface. This portion serves as a positive electrode tab. Like the negative electrode tabs (portion 3c), the positive electrode tabs do not overlap the negative electrodes 3. Further, the positive electrode tabs are located on the opposite side of the electrode group 1 with respect to the negative electrode tabs (portion 3c). The positive electrode tabs are electrically connected to the strip-shaped positive electrode terminal 7. A tip of the strip-shaped positive electrode terminal 7 is located on the opposite side relative to the negative electrode terminal 6 and drawn to the outside from the container member 2.

The secondary battery according to the second embodiment contains the electrode according to the first embodiment. Thus, the secondary battery according to the second embodiment can exhibit excellent output and excellent cycle life performance.

Third Embodiment

According to a third embodiment, a battery module is provided. The battery module according to the third embodiment includes plural secondary batteries according to the second embodiment.

In the battery module according to the third embodiment, each of the single-batteries may be arranged electrically connected in series, in parallel, or in a combination of in-series connection and in-parallel connection.

An example of the battery module according to the third embodiment will be described next with reference to the drawings.

FIG. 5 is a perspective view schematically showing an example of the battery module according to the third embodiment. A battery module 200 shown in FIG. 5 includes five single-batteries 100a to 100e, four bus bars 21, a positive electrode-side lead 22, and a negative electrode-side lead 23. Each of the five single-batteries 100a to 100e is a secondary battery according to the second embodiment.

The bus bar 21 connects, for example, a negative electrode terminal 6 of one single-battery 100a and a positive electrode terminal 7 of the single-battery 100b positioned adjacent. In such a manner, five single-batteries 100 are thus connected in series by the four bus bars 21. That is, the battery module 200 shown in FIG. 5 is a battery module of five in-series connection.

As shown in FIG. 5, the positive electrode terminal 7 of the single-battery 100a located at the left end among the five single-batteries 100a to 100e is connected to the positive electrode-side lead 22 for external connection. In addition, the negative electrode terminal 6 of the single-battery 100e located at the right end among the five single-batteries 100a to 100e is connected to the negative electrode-side lead 23 for external connection.

The battery module according to the third embodiment includes the secondary battery according to the second embodiment. Thus, the battery module can exhibit excellent output and excellent cycle life performance.

Fourth Embodiment

According to a fourth embodiment, a battery pack is provided. The battery pack includes a battery module according to the third embodiment. The battery pack may include a single secondary battery according to the second embodiment, in place of the battery module according to the third embodiment.

The battery pack according to the fourth embodiment may further include a protective circuit. The protective circuit has a function to control charging and discharging of the secondary battery. Alternatively, a circuit included in equipment where the battery pack serves as a power source (for example, electronic devices, vehicles, and the like) may be used as the protective circuit for the battery pack.

Moreover, the battery pack according to the fourth embodiment may further include an external power distribution terminal. The external power distribution terminal is configured to externally output current from the secondary battery, and to input external current into the secondary battery. In other words, when the battery pack is used as a power source, the current is provided out via the external power distribution terminal. When the battery pack is charged, the charging current (including regenerative energy of motive force of vehicles such as automobiles) is provided to the battery pack via the external power distribution terminal.

Next, an example of a battery pack according to the fourth embodiment will be described with reference to the drawings.

Figure 6:
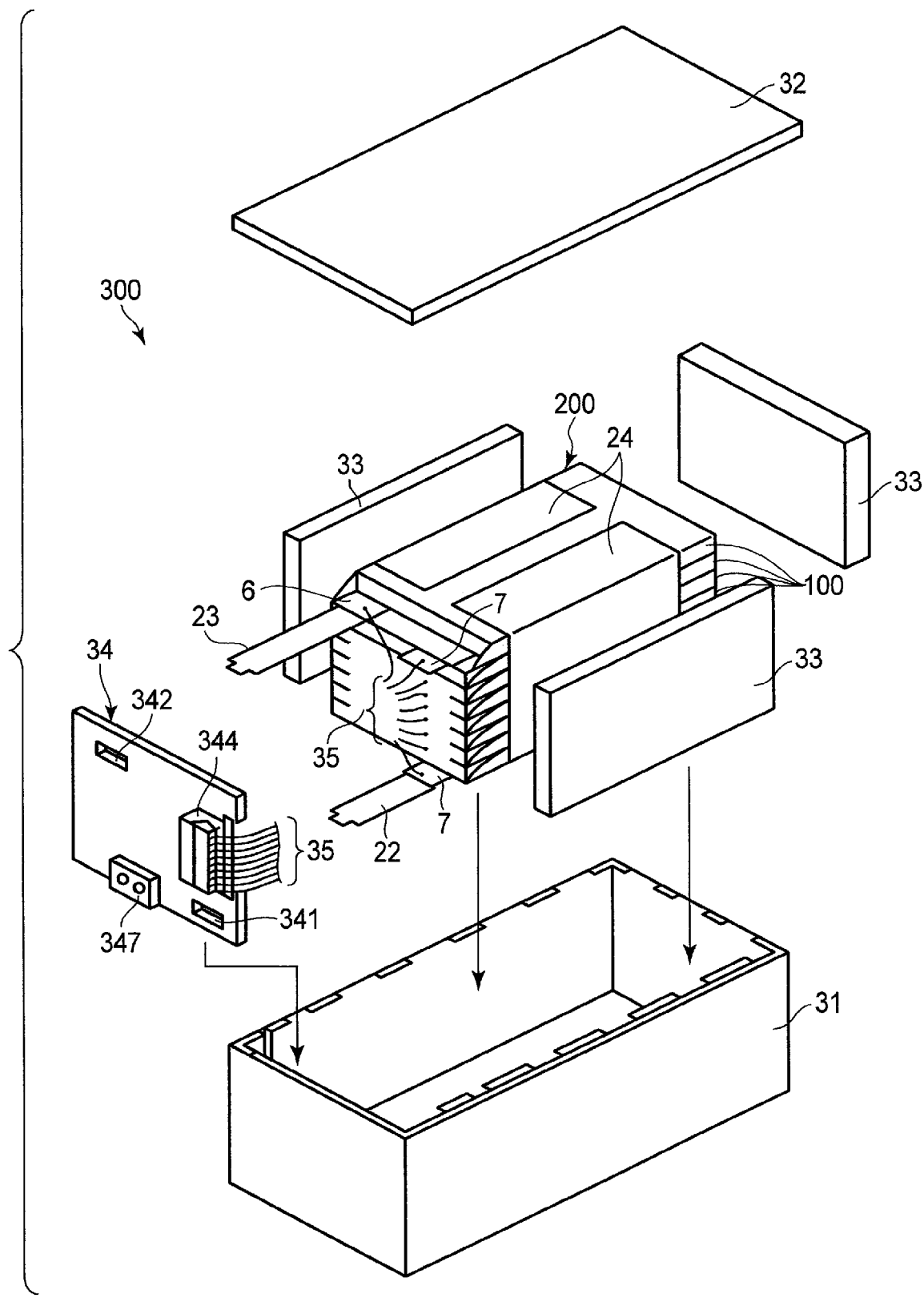
FIG. 6 is an exploded perspective view schematically showing an example of a battery pack according to an embodiment.

FIG. 6 is an exploded perspective view schematically showing an example of the battery pack according to the fourth embodiment. FIG. 7 is a block diagram showing an example of an electric circuit of the battery pack shown in FIG. 6.

A battery pack 300 shown in FIGS. 6 and 7 includes a housing container 31, a lid 32, protective sheets 33, a battery module 200, a printed wiring board 34, wires 35, and an insulating plate (not shown).

The housing container 31 shown in FIG. 6 is a square bottomed container having a rectangular bottom surface. The housing container 31 is configured to be capable of storing the protective sheets 33, the battery module 200, the printed wiring board 34, and the wires 35. The lid 32 has a rectangular shape. The lid 32 covers the housing container 31 to house the battery module 200 and such. The housing container 31 and the lid 32 are provided with openings, connection terminals, or the like (not shown) for connection to an external device or the like.

The battery module 200 includes plural single-batteries 100, a positive electrode-side lead 22, a negative electrode-side lead 23, and adhesive tape(s) 24.

A single-battery 100 may have a structure shown in FIGS. 1 and 2, for example. At least one of the plural single-batteries 100 is a secondary battery according to the second embodiment. The plural single-batteries 100 are stacked such that the negative electrode terminals 6 and the positive electrode terminals 7, which extend outside, are directed toward the same direction. The plural single-batteries 100 are electrically connected in series, as shown in FIG. 7. The plural single-batteries 100 may alternatively be electrically connected in parallel, or connected in a combination of in-series connection and in-parallel connection. If the plural single-batteries 100 are connected in parallel, the battery capacity increases as compared to a case in which they are connected in series.

The adhesive tape(s) 24 fastens the plural single-batteries 100. The plural single-batteries 100 may be fixed using a heat-shrinkable tape in place of the adhesive tape(s) 24. In this case, the protective sheets 33 are arranged on both side surfaces of the battery module 200, and the heat-shrinkable tape is wound around the battery module 200 and protective sheets 33. After that, the heat-shrinkable tape is shrunk by heating to bundle the plural single-batteries 100.

One end of the positive electrode-side lead 22 is connected to the positive electrode terminal 7 of the single-battery 100 located lowermost in the stack of the single-batteries 100. One end of the negative electrode-side lead 23 is connected to the negative electrode terminal 6 of the single-battery 100 located uppermost in the stack of the single-batteries 100.

The printed wiring board 34 is provided along one face in the short-side direction among the inner surfaces of the housing container 31. The printed wiring board 34 includes a positive electrode-side connector 341, a negative electrode-side connector 342, a thermistor 343, a protective circuit 344, wirings 345 and 346, an external power distribution terminal 347, a plus-side (positive-side) wire 348a, and a minus-side (negative-side) wire 348b. One principal surface of the printed wiring board 34 faces the surface of the battery module 200 from which the negative electrode terminals 6 and the positive electrode terminals 7 extend out. An insulating plate (not shown) is disposed in between the printed wiring board 34 and the battery module 200.

The positive electrode-side connector 341 is provided with a through hole. By inserting the other end of the positive electrode-side lead 22 into the though hole, the positive electrode-side connector 341 and the positive electrode-side lead 22 become electrically connected. The negative electrode-side connector 342 is provided with a through hole. By inserting the other end of the negative electrode-side lead 23 into the though hole, the negative electrode-side connector 342 and the negative electrode-side lead 23 become electrically connected.

The thermistor 343 is fixed to one principal surface of the printed wiring board 34. The thermistor 343 detects the temperature of each single-battery 100 and transmits detection signals to the protective circuit 344.

The external power distribution terminal 347 is fixed to the other principal surface of the printed wiring board 34. The external power distribution terminal 347 is electrically connected to device(s) that exists outside the battery pack 300.

The protective circuit 344 is fixed to the other principal surface of the printed wiring board 34. The protective circuit 344 is connected to the external power distribution terminal 347 via the plus-side wire 348a. The protective circuit 344 is connected to the external power distribution terminal 347 via the minus-side wire 348b. In addition, the protective circuit 344 is electrically connected to the positive electrode-side connector 341 via the wiring 345. The protective circuit 344 is electrically connected to the negative electrode-side connector 342 via the wiring 346. Furthermore, the protective circuit 344 is electrically connected to each of the plural single-batteries 100 via the wires 35.

The protective sheets 33 are arranged on both inner surfaces of the housing container 31 along the long-side direction and on the inner surface along the short-side direction facing the printed wiring board 34 across the battery module 200 positioned therebetween. The protective sheets 33 are made of, for example, resin or rubber.

The protective circuit 344 controls charge and discharge of the plural single-batteries 100. The protective circuit 344 is also configured to cut-off electric connection between the protective circuit 344 and the external power distribution terminal 347 to external device(s), based on detection signals transmitted from the thermistor 343 or detection signals transmitted from each single-battery 100 or the battery module 200.

An example of the detection signal transmitted from the thermistor 343 is a signal indicating that the temperature of the single-battery (single-batteries) 100 is detected to be a predetermined temperature or more. An example of the detection signal transmitted from each single-battery 100 or the battery module 200 include a signal indicating detection of over-charge, over-discharge, and overcurrent of the single-battery (single-batteries) 100. When detecting over-charge or the like for each of the single batteries 100, the battery voltage may be detected, or a positive electrode potential or negative electrode potential may be detected. In the latter case, a lithium electrode to be used as a reference electrode may be inserted into each single-battery 100.

Note, that as the protective circuit 344, a circuit included in a device (for example, an electronic device or an automobile) that uses the battery pack 300 as a power source may be used.

As described above, the battery pack 300 includes the external power distribution terminal 347. Hence, the battery pack 300 can output current from the battery module 200 to an external device and input current from an external device to the battery module 200 via the external power distribution terminal 347. In other words, when using the battery pack 300 as a power source, the current from the battery module 200 is supplied to an external device via the external power distribution terminal 347. When charging the battery pack 300, a charge current from an external device is supplied to the battery pack 300 via the external power distribution terminal 347. If the battery pack 300 is used as an onboard battery, the regenerative energy of the motive force of a vehicle can be used as the charge current from the external device.

Note that the battery pack 300 may include plural battery modules 200. In this case, the plural battery modules 200 may be connected in series, in parallel, or connected in a combination of in-series connection and in-parallel connection. The printed wiring board 34 and the wires 35 may be omitted. In this case, the positive electrode-side lead 22 and the negative electrode-side lead 23 may be used as the external power distribution terminal.

Such a battery pack 300 is used, for example, in applications where excellent cycle performance is demanded when a large current is extracted. More specifically, the battery pack 300 is used as, for example, a power source for electronic devices, a stationary battery, or an onboard battery for various kinds of vehicles. An example of the electronic device is a digital camera. The battery pack 300 is particularly favorably used as an onboard battery.

The battery pack according to the fourth embodiment is provided with the secondary battery according to the second embodiment or the battery module according to the third embodiment. Accordingly, the battery pack according to the fourth embodiment can exhibit excellent output performance and excellent cycle life performance.

Fifth Embodiment

According to a fifth embodiment, a vehicle is provided. The battery pack according to the fourth embodiment is installed on this vehicle.

In the vehicle according to the fifth embodiment, the battery pack is configured, for example, to recover regenerative energy from motive force of the vehicle.

Examples of the vehicle according to the fifth embodiment include two-wheeled to four-wheeled hybrid electric automobiles, two-wheeled to four-wheeled electric automobiles, electrically assisted bicycles, and railway cars.

In the vehicle according to the fifth embodiment, the installing position of the battery pack is not particularly limited. For example, the battery pack may be installed in the engine compartment of the vehicle, in rear parts of the vehicle, or under seats.

The vehicle according to the fifth embodiment may have plural battery packs installed. In such a case, the battery packs may be electrically connected in series, electrically connected in parallel, or electrically connected in a combination of in-series connection and in-parallel connection.

An example of the vehicle according to the fifth embodiment is explained below, with reference to the drawings.

FIG. 8 is a cross-sectional view schematically showing an example of a vehicle according to the fifth embodiment.

A vehicle 400, shown in FIG. 8 includes a vehicle body 40 and a battery pack 300 according to the fourth embodiment. In the example shown in FIG. 8, the vehicle 400 is a four-wheeled automobile.

This vehicle 400 may have plural battery packs 300 installed. In such a case, the battery packs 300 may be connected in series, connected in parallel, or connected in a combination of in-series connection and in-parallel connection.

In FIG. 8, shown is an example where the battery pack 300 is installed in an engine compartment located at the front of the vehicle body 40. As mentioned above, for example, the battery pack 300 may be alternatively installed in rear sections of the vehicle body 40, or under a seat. The battery pack 300 may be used as a power source of the vehicle 400. The battery pack 300 can also recover regenerative energy of motive force of the vehicle 400.

Next, with reference to FIG. 9, an aspect of operation of the vehicle according to the fifth embodiment is explained.

FIG. 9 is a view schematically showing another example of the vehicle according to the fifth embodiment. A vehicle 400, shown in FIG. 9, is an electric automobile.

The vehicle 400, shown in FIG. 9, includes a vehicle body 40, a vehicle power source 41, a vehicle ECU (electric control unit) 42, which is a master controller of the vehicle power source 41, an external terminal (an external power connection terminal) 43, an inverter 44, and a drive motor 45.

The vehicle 400 includes the vehicle power source 41, for example, in the engine compartment, in the rear sections of the automobile body, or under a seat. In FIG. 9, the position of the vehicle power source 41 installed in the vehicle 400 is schematically shown.

The vehicle power source 41 includes plural (for example, three) battery packs 300a, 300b and 300c, a battery management unit (BMU) 411, and a communication bus 412.

The three battery packs 300a, 300b and 300c are electrically connected in series. The battery pack 300a includes a battery module 200a and a battery module monitoring unit 301a (e.g., a VTM: voltage temperature monitoring). The battery pack 300b includes a battery module 200b, and a battery module monitoring unit 301b. The battery pack 300c includes a battery module 200c, and a battery module monitoring unit 301c. The battery packs 300a, 300b and 300c can each be independently removed, and may be exchanged by a different battery pack 300.

Each of the battery modules 200a to 200c includes plural single-batteries connected in series. At least one of the plural single-batteries is the secondary battery according to the second embodiment. The battery modules 200a to 200c each perform charging and discharging via a positive electrode terminal 413 and a negative electrode terminal 414.

In order to collect information concerning security of the vehicle power source 41, the battery management unit 411 performs communication with the battery module monitoring units 301a to 301c and collects information such as voltages or temperatures of the single-batteries 100 included in the battery modules 200a to 200c included in the vehicle power source 41.

The communication bus 412 is connected between the battery management unit 411 and the battery module monitoring units 301a to 301c. The communication bus 412 is configured so that multiple nodes (i.e., the battery management unit and one or more battery module monitoring units) share a set of communication lines. The communication bus 412 is, for example, a communication bus configured based on CAN (Control Area Network) standard.

The battery module monitoring units 301a to 301c measure a voltage and a temperature of each single-battery in the battery modules 200a to 200c based on commands from the battery management unit 411. It is possible, however, to measure the temperatures only at several points per battery module, and the temperatures of all of the single-batteries need not be measured.

The vehicle power source 41 may also have an electromagnetic contactor (for example, a switch unit 415 shown in FIG. 9) for switching connection between the positive electrode terminal 413 and the negative electrode terminal 414. The switch unit 415 includes a precharge switch (not shown), which is turned on when the battery modules 200a to 200c are charged, and a main switch (not shown), which is turned on when battery output is supplied to a load. The precharge switch and the main switch include a relay circuit (not shown), which is turned on or off based on a signal provided to a coil disposed near the switch elements.

The inverter 44 converts an inputted direct current voltage to a three-phase alternate current (AC) high voltage for driving a motor. Three-phase output terminal(s) of the inverter 44 is (are) connected to each three-phase input terminal of the drive motor 45. The inverter 44 controls an output voltage based on control signals from the battery management unit 411 or the vehicle ECU 42, which controls the entire operation of the vehicle.

The drive motor 45 is rotated by electric power supplied from the inverter 44. The rotation is transferred to an axle and driving wheels W via a differential gear unit, for example.

The vehicle 400 also includes a mechanism configured to convert kinetic energy of the vehicle into regenerative energy, though not shown. Examples of the mechanism include a regenerative brake mechanism. The regenerative brake mechanism rotates the drive motor 45 when the vehicle 400 is braked, and converts kinetic energy into regenerative energy, as electric energy. The regenerative energy, recovered in the regenerative brake mechanism, is inputted into the inverter 44 and converted to direct current. The direct current is inputted into the vehicle power source 41.

One terminal of a connecting line L1 is connected via a current detector (not shown) in the battery management unit 411 to the negative electrode terminal 414 of the vehicle power source 41. The other terminal of the connecting line L1 is connected to a negative electrode input terminal of the inverter 44.

One terminal of a connecting line L2 is connected via the switch unit 415 to the positive electrode terminal 413 of the vehicle power source 41. The other terminal of the connecting line L2 is connected to a positive electrode input terminal of the inverter 44.

The external terminal 43 is connected to the battery management unit 411. The external terminal 43 is able to connect, for example, to an external power source.

The vehicle. ECU 42 cooperatively controls the battery management unit 411 together with other units in response to inputs operated by a driver or the like, thereby performing the management of the whole vehicle. Data concerning the security of the vehicle power source 41, such as a remaining capacity of the vehicle power source 41, are transferred between the battery management unit 411 and the vehicle ECU 42 via communication lines.

The vehicle according to the fifth embodiment is installed with the battery pack according to the fourth embodiment. Accordingly, a high performance vehicle can be provided by virtue of the battery pack exhibiting excellent output performance. In addition, the vehicle exhibits high reliability by virtue of the battery pack exhibiting excellent life performance.

EXAMPLES

Examples will be described hereinafter, but the embodiment is not limited to the examples described below.

Example 1

In Example 1, a nonaqueous electrolyte battery was produced by the following procedure.

<Production of Negative Electrode Precursor>

$Li_2CO_3$ powder, $Na_2CO_3$ powder, $Nb_2O_5$ powder and $TiO_2$ powder, which are commercially available oxide reagents, were weighed such that a molar ratio of lithium:sodium:titanium:niobium was 4:1:11:1, and mixed using a mortar. The mixture was placed in an electric furnace and fired at 1000° C. for 20 hours total. In this manner, a lithium niobium-titanate composite oxide $Li_2Na_{0.5}Ti_{5.5}Nb_{0.5}O_{14}$ was obtained.

An active material ($Li_2Na_{0.5}Ti_{5.5}Nb_{0.5}O_{14}$) synthesized in the above-described manner as an electrode active material and acetylene black as the electro-conductive agent were mixed. A mixing ratio was 90:5. This mixture was dispersed in N-methyl-2-pyrrolidone (NMP) to obtain a dispersion solution. The obtained dispersion solution was mixed with 5 parts by weight of polyvinylidene fluoride (PVdF) as a binder with respect to 100 parts by weight of the active material. In addition, the dispersion solution was mixed with aluminum alkoxide such that the weight of aluminum was 0.1% by weight based on the weight of the active material to prepare a negative electrode slurry.

The slurry was applied using a blade onto both sides of a current collector made of an aluminum foil, and then, the applied coat was dried. Thereafter, press forming was performed such that an electrode density (electrode portion excluding the aluminum foil) was 2.3 g/cm$^3$, and then, drying in vacuum at 130° C. was performed for 12 hours to obtain a negative electrode precursor (first electrode precursor).

<Production of Positive Electrode>

A mixture was obtained by mixing 5 parts by mass of acetylene black as an electro-conductive agent to 100 parts by mass of a commercially available spinel-type lithium manganese oxide ($LiMn_2O_4$). Next, this mixture was dispersed in NMP to obtain a dispersion solution. The dispersion solution was mixed with PVdF as a binder at a ratio of 5 parts by mass relative to the lithium manganese oxide to prepare a positive electrode slurry. This slurry was applied using a blade onto both sides of a current collector made of an aluminum foil. The resultant was dried under vacuum at 130° C. for 12 hours, and then, rolled such that a density of the electrode layer (excluding the current collector) was 2.1 g/cm$^3$ to obtain a positive electrode.

<Production of Electrode Group>

The positive electrode and the negative electrode precursor produced as above were stacked with a polyethylene separator sandwiched therebetween to obtain a stack. Next, the stack was wound and further pressed to obtain a wound electrode group having a flat shape. A positive electrode terminal and a negative electrode terminal were connected to this electrode group.

<Preparation of Liquid Nonaqueous Electrolyte>

As a mixed solvent, a mixed solvent of propylene carbonate and methylethyl carbonate (volume ratio of 1:2) was prepared. Into this solvent, lithium hexafluorophosphate ($LiPF_6$) was dissolved in at a concentration of 1 M, and hexamethylene diisocyanate was dissolved in at 1% by weight. Thus, a liquid nonaqueous electrolyte was prepared.

<Aging Treatment>

A battery unit was assembled using the electrode group and the liquid nonaqueous electrolyte produced as above.

Initial charging and discharging at 0.2 C was performed on the battery unit according to the above-described procedure. Subsequently, charging was performed again until the SOC reached 20%. Thereafter, the battery unit was held in a thermostat at 80° C. for 24 hours. The battery after the aging treatment was transferred into a glove box in an argon atmosphere, and the battery was unsealed. Thereafter, the battery was re-sealed in a vacuum atmosphere.

Thus, a nonaqueous electrolyte battery was obtained.

Details or amounts of various materials used for manufacturing of the nonaqueous electrolyte battery are summarized in the following Table 1. Specifically, Table 1 shows a composition of a used positive electrode active material, a composition of a negative electrode active material, a solvent composition of an electrolytic solution (liquid nonaqueous electrolyte), a composition and a concentration of electrolyte salt, and an addition amount of hexamethylene diisocyanate to the electrolytic solution.

TABLE 1

| | Positive Electrode Active Material | Negative Electrode Active Material | Solvent | Electrolyte salt composition/ concentration (M) | Addition Amount of Isocyanate Compound (wt %) |
|---|---|---|---|---|---|
| Example 1 | $LiMn_2O_4$ | $Li_2Na_{0.5}Ti_{5.5}Nb_{0.5}O_{14}$ | PC:MEC = 1:2 | $LiPF_6$/1.0 | 1 |
| Example 2 | $LiMn_2O_4$ | $Li_2Na_{0.5}Ti_{5.5}Nb_{0.5}O_{14}$ | PC:MEC = 1:2 | $LiPF_6$/1.0 | 1 |
| Example 3 | $LiMn_2O_4$ | $Li_2Na_{0.5}Ti_{5.5}Nb_{0.5}O_{14}$ | PC:MEC = 1:2 | $LiPF_6$/1.0 | 1 |
| Example 4 | $LiMn_2O_4$ | $Li_2Na_{0.5}Ti_{5.5}Nb_{0.5}O_{14}$ | PC:MEC = 1:2 | $LiPF_6$/1.0 | 0.1 |
| Example 5 | $LiMn_2O_4$ | $Li_2Na_{0.5}Ti_{5.5}Nb_{0.5}O_{14}$ | PC:MEC = 1:2 | $LiPF_6$/1.0 | 0.3 |
| Example 6 | $LiMn_2O_4$ | $Li_2Na_{0.5}Ti_{5.5}Nb_{0.5}O_{14}$ | PC:MEC = 1:2 | $LiPF_6$/1.0 | 0.5 |
| Example 7 | $LiMn_2O_4$ | $Li_2Na_{0.5}Ti_{5.5}Nb_{0.5}O_{14}$ | PC:MEC = 1:2 | $LiPF_6$/1.0 | 1 |
| Example 8 | $LiMn_2O_4$ | $Li_2Na_{0.5}Ti_{5.5}Nb_{0.5}O_{14}$ | PC:MEC = 1:2 | $LiPF_6$/1.0 | 1 |
| Example 9 | $LiMn_2O_4$ | $Li_2Na_{0.5}Ti_{5.5}Nb_{0.5}O_{14}$ | PC:MEC = 1:2 | $LiPF_6$/1.0 | 1 |
| Example 10 | $LiMn_2O_4$ | $Li_2Na_{0.5}Ti_{5.5}Nb_{0.5}O_{14}$ | PC:MEC = 1:2 | $LiPF_6$/1.0 | 1 |
| Example 11 | $LiMn_2O_4$ | $Li_2Na_{0.5}Ti_{5.5}Nb_{0.5}O_{14}$ | PC:MEC = 1:2 | $LiPF_6$/1.0 | 0.1 |
| Example 12 | $LiMn_2O_4$ | $Li_2Na_{0.5}Ti_{5.5}Nb_{0.5}O_{14}$ | PC:MEC = 1:2 | $LiPF_6$/1.0 | 0.3 |
| Example 13 | $LiMn_2O_4$ | $Li_2Na_{0.5}Ti_{5.5}Nb_{0.5}O_{14}$ | PC:MEC = 1:2 | $LiPF_6$/1.0 | 0.5 |
| Example 14 | $LiMn_2O_4$ | $Li_2Na_{0.5}Ti_{5.5}Nb_{0.5}O_{14}$ | PC:MEC = 1:2 | $LiPF_6$/1.0 | 1 |
| Example 15 | $LiMn_2O_4$ | $Li_2Na_2Ti_6O_{14}$ | PC:MEC = 1:2 | $LiPF_6$/1.0 | 1 |
| Example 16 | $LiMn_2O_4$ | $TiNb_2O_7$ | PC:MEC = 1:2 | $LiPF_6$/1.0 | 1 |
| Example 17 | $LiMn_2O_4$ | $Li_4Ti_5O_{12}$ | PC:MEC = 1:2 | $LiPF_6$/1.0 | 1 |
| Comparative Example 1 | $LiMn_2O_4$ | $Li_2Na_{0.5}Ti_{5.5}Nb_{0.5}O_{14}$ | PC:MEC = 1:2 | $LiPF_6$/1.0 | 0 |
| Comparative Example 2 | $LiMn_2O_4$ | $Li_2Na_{0.5}Ti_{5.5}Nb_{0.5}O_{14}$ | PC:MEC = 1:2 | $LiPF_6$/1.0 | 0 |
| Comparative Example 3 | $LiMn_2O_4$ | $Li_2Na_{0.5}Ti_{5.5}Nb_{0.5}O_{14}$ | PC:MEC = 1:2 | $LiPF_6$/1.0 | 0 |
| Comparative Example 4 | $LiMn_2O_4$ | $Li_2Na_{0.5}Ti_{5.5}Nb_{0.5}O_{14}$ | PC:MEC = 1:2 | $LiPF_6$/1.0 | 0 |
| Comparative Example 5 | $LiMn_2O_4$ | $Li_2Na_{0.5}Ti_{5.5}Nb_{0.5}O_{14}$ | PC:MEC = 1:2 | $LiPF_6$/1.0 | 0 |
| Comparative Example 6 | $LiMn_2O_4$ | $Li_2Na_{0.5}Ti_{5.5}Nb_{0.5}O_{14}$ | PC:MEC = 1:2 | $LiPF_6$/1.0 | 0 |
| Comparative Example 7 | $LiMn_2O_4$ | $Li_2Na_{0.5}Ti_{5.5}Nb_{0.5}O_{14}$ | PC:MEC = 1:2 | $LiPF_6$/1.0 | 1 |
| Comparative Example 8 | $LiMn_2O_4$ | $Li_2Na_{0.5}Ti_{5.5}Nb_{0.5}O_{14}$ | PC:MEC = 1:2 | $LiPF_6$/1.0 | 1 |
| Comparative Example 9 | $LiMn_2O_4$ | $Li_2Na_{0.5}Ti_{5.5}Nb_{0.5}O_{14}$ | PC:MEC = 1:2 | $LiPF_6$/1.0 | 1 |
| Comparative Example 10 | $LiMn_2O_4$ | $Li_2Na_{0.5}Ti_{5.5}Nb_{0.5}O_{14}$ | PC:MEC = 1:2 | $LiPF_6$/1.0 | 1 |

An alumina coating method in the negative electrode precursor and aging treatment conditions of the battery unit are summarized in the following Table 2. A temperature, a treatment time, and an SOC of the battery unit at the start of aging treatment are shown as the aging treatment conditions.

Example 3

A nonaqueous electrolyte battery was produced in the same procedure as in Example 1, except that the mixing amount of aluminum alkoxide was changed such that the weight of aluminum was 0.3% by weight based on the weight of active material at the time of preparing the slurry during production of the negative electrode precursor (first electrode precursor).

Examples 4 to 6

Nonaqueous electrolyte batteries were produced in the same manner as in Example 1, except that the addition amount of hexamethylene diisocyanate to the electrolytic

TABLE 2

| | | Aging Treatment Condition | | |
|---|---|---|---|---|
| | Alumina Coating Method | Temperature (° C.) | SOC (%) | Time (h) |
| Example 1 | Aluminum alkoxide is mixed into negative electrode slurry | 80 | 20 | 24 |
| Example 2 | Aluminum alkoxide is mixed into negative electrode slurry | 80 | 20 | 24 |
| Example 3 | Aluminum alkoxide is mixed into negative electrode slurry | 80 | 20 | 24 |
| Example 4 | Aluminum alkoxide is mixed into negative electrode slurry | 80 | 20 | 24 |
| Example 5 | Aluminum alkoxide is mixed into negative electrode slurry | 80 | 20 | 24 |
| Example 6 | Aluminum alkoxide is mixed into negative electrode slurry | 80 | 20 | 24 |
| Example 7 | Aluminum alkoxide is mixed into negative electrode slurry | 65 | 90 | 96 |
| Example 8 | Immersion of electrode in alkoxide diluted solution | 80 | 20 | 24 |
| Example 9 | Immersion of electrode in alkoxide diluted solution | 80 | 20 | 24 |
| Example 10 | Immersion of electrode in alkoxide diluted solution | 80 | 20 | 24 |
| Example 11 | Immersion of electrode in alkoxide diluted solution | 80 | 20 | 24 |
| Example 12 | Immersion of electrode in alkoxide diluted solution | 80 | 20 | 24 |
| Example 13 | Immersion of electrode in alkoxide diluted solution | 80 | 20 | 24 |
| Example 14 | Immersion of electrode in alkoxide diluted solution | 65 | 90 | 96 |
| Example 15 | Aluminum alkoxide is mixed into negative electrode slurry | 80 | 20 | 24 |
| Example 16 | Aluminum alkoxide is mixed into negative electrode slurry | 80 | 20 | 24 |
| Example 17 | Aluminum alkoxide is mixed into negative electrode slurry | 80 | 20 | 24 |
| Comparative Example 1 | (No Coating Treatment) | 80 | 20 | 24 |
| Comparative Example 2 | Aluminum alkoxide is mixed into negative electrode slurry | 80 | 20 | 24 |
| Comparative Example 3 | (No Coating Treatment) | 60 | 24 | 24 |
| Comparative Example 4 | Aluminum alkoxide is mixed into negative electrode slurry | 60 | 24 | 24 |
| Comparative Example 5 | (No Coating Treatment) | 60 | 48 | 24 |
| Comparative Example 6 | Aluminum alkoxide is mixed into negative electrode slurry | 60 | 48 | 24 |
| Comparative Example 7 | Aluminum alkoxide is mixed into active material before preparing negative electrode slurry | 80 | 20 | 24 |
| Comparative Example 8 | Aluminum alkoxide is mixed into active material before preparing negative electrode slurry | 80 | 20 | 24 |
| Comparative Example 9 | Aluminum alkoxide is mixed into negative electrode slurry | No Treatment | No Treatment | No Treatment |
| Comparative Example 10 | (No Coating Treatment) | 80 | 20 | 24 |

Example 2

A nonaqueous electrolyte battery was produced in the same procedure as in Example 1, except that a mixing amount of aluminum alkoxide was changed such that the weight of aluminum was 0.2% by weight based on the weight of active material at the time of preparing the slurry in preparation of the negative electrode precursor (first electrode precursor).

solution was changed to values shown in Table 1. That is, the same negative electrode precursor (first electrode precursor) as that of Example 1 was used.

Example 7

A nonaqueous electrolyte battery was produced in the same manner as in Example 1, except that aging treatment conditions were changed to the conditions shown in Table 2. That is, the same negative electrode precursor (first electrode precursor) as that of Example 1 was used.

Example 8

An active material ($Li_2Na_{0.5}Ti_{5.5}Nb_{0.5}O_{14}$), synthesized in the same manner as in Example 1, as electrode active material and acetylene black as electro-conductive agent were mixed. A mixing ratio was 90:5. This mixture was dispersed in N-methyl-2-pyrrolidone (NMP) to obtain a dispersion solution. The obtained dispersion solution was mixed with 5 parts by weight of polyvinylidene fluoride (PVdF) as a binder with respect to 100 parts by weight of the active material to prepare a negative electrode slurry.

The slurry was applied using a blade onto both sides of a current collector made of an aluminum foil and dried. Thereafter, press forming was performed such that the electrode density (electrode portion excluding the aluminum foil) was 2.3 g/cm$^3$, and then, drying in vacuum at 130° C. was performed for 12 hours. The obtained intermediate member was immersed in a solution of aluminum alkoxide:ethanol=1:9 (weight ratio) for 30 seconds under an environment having a dew point of −40° C., and then, taken out. The taken-out intermediate member was dried in vacuum at 130° C. for 24 hours.

A nonaqueous electrolyte battery was produced in the same manner as in Example 1, except that the dried intermediate member was used as a negative electrode precursor (second electrode precursor).

Example 9

A nonaqueous electrolyte battery was produced in the same manner as in Example 8, except that the solution impregnated into the intermediate member was changed to a solution of aluminum alkoxide:ethanol=2:9 (weight ratio) when producing the negative electrode precursor (second electrode precursor).

Example 10

A nonaqueous electrolyte battery was produced in the same manner as in Example 8, except that the solution impregnated into the intermediate member was changed to a solution of aluminum alkoxide:ethanol=3:9 (weight ratio) when producing the negative electrode precursor (second electrode precursor).

Examples 11 to 13

Nonaqueous electrolyte batteries were produced in the same manner as in Example 8, except that the addition amount of hexamethylene diisocyanate to the electrolytic solution was changed to values shown in Table 1. That is, the same negative electrode precursor (second electrode precursor) as that of Example 8 was used.

Example 14

A nonaqueous electrolyte battery was produced in the same manner as in Example 8, except that aging treatment conditions were changed to the conditions shown in Table 2. That is, the same negative electrode precursor (second electrode precursor) as that of Example 8 was used.

Example 15

$Li_2CO_3$ powder, $Na_2CO_3$ powder, $Nb_2O_5$ powder and $TiO_2$ powder, which are commercially available oxide reagents, were weighed such that a molar ratio of lithium: sodium:titanium was 1:1:3, and mixed using a mortar. The mixture was placed in an electric furnace and fired at 1000° C. for 20 hours. In this manner, a lithium sodium titanate composite oxide $Li_2Na_2Ti_6O_{14}$ was obtained.

A nonaqueous electrolyte battery was produced in the same manner as in Example 1, except that a negative electrode precursor (first electrode precursor) was prepared using the above-described active material ($Li_2Na_2Ti_6O_{14}$) as the electrode active material.

Example 16

$Nb_2O_5$ powder and $TiO_2$ powder, which are commercially available oxide reagents, were weighed such that a molar ratio of niobium to titanium was 2, and mixed using a mortar. The mixture was placed in an electric furnace and fired at 1150° C. for 20 hours. Thus, a niobium-titanium composite oxide $TiNb_2O_7$ was obtained.

A nonaqueous electrolyte battery was produced in the same manner as in Example 1, except that a negative electrode precursor (first electrode precursor) was prepared using the above-described active material ($TiNb_2O_7$) as the electrode active material.

Example 17

A spinel type lithium titanate $Li_4Ti_5O_{12}$ was prepared as the electrode active material. A nonaqueous electrolyte battery was produced in the same manner as in Example 1, except that a negative electrode precursor (first electrode precursor) was prepared using the electrode active material.

Comparative Example 1

An active material ($Li_2Na_{0.5}Ti_{5.5}Nb_{0.5}O_{14}$), synthesized in the same manner as in Example 1, as an electrode active material and acetylene black as an electro-conductive agent were mixed. A mixing ratio was 90:5. This mixture was dispersed in N-methyl-2-pyrrolidone (NMP) to obtain a dispersion solution. The obtained dispersion solution was mixed with 5 parts by weight of polyvinylidene fluoride (PVdF) as a binder with respect to 100 parts by weight of the active material to prepare a negative electrode slurry.

The slurry was applied using a blade onto both sides of a current collector made of an aluminum foil and dried. Thereafter, press forming was performed such that the electrode density (electrode portion excluding the aluminum foil) was 2.3 g/cm$^3$, and then, drying in vacuum at 130° C. was performed for 12 hours to obtain a negative electrode precursor.

In addition, the addition of hexamethylene diisocyanate was omitted when preparing the liquid nonaqueous electrolyte.

A nonaqueous electrolyte battery was prepared in the same manner as in Example 1, except that these negative electrode precursor and liquid nonaqueous electrolyte were used.

In Comparative Example 1, no alumina coating method was used, neither the method of mixing the aluminum alkoxide into the slurry nor the method of forming the alumina coating by immersing the electrode in the diluted solution. In addition, no isocyanate compound was used in Comparative Example 1.

Comparative Example 2

A nonaqueous electrolyte battery was produced in the same procedure as in Example 1, except that the addition amount of hexamethylene diisocyanate to the electrolytic solution and the mixing amount of aluminum alkoxide (content ratio of aluminum relative to the active material) to the dispersion solution at the time of preparing the slurry during production of a negative electrode precursor (first electrode precursor) were changed to values shown in Table 1.

Comparative Example 3

A nonaqueous electrolyte battery was produced in the same manner as in Comparative Example 1, except that aging treatment conditions were changed to the conditions shown in Table 2.

Comparative Example 4

A nonaqueous electrolyte battery was produced in the same manner as in Comparative Example 2, except that aging treatment conditions were changed to the conditions shown in Table 2. That is, the same negative electrode precursor (first electrode precursor) as that of Comparative Example 2 was used.

Comparative Example 5

A nonaqueous electrolyte battery was produced in the same manner as in Comparative Example 1, except that aging treatment conditions were changed to the conditions shown in Table 2.

Comparative Example 6

A nonaqueous electrolyte battery was produced in the same manner as in Comparative Example 2, except that aging treatment conditions were changed to the conditions shown in Table 2. That is, the same negative electrode precursor (first electrode precursor) as that of Comparative Example 2 was used.

Comparative Example 7

An active material ($Li_2Na_{0.5}Ti_{5.5}Nb_{0.5}O_{14}$), synthesized in the same manner as in Example 1, was prepared as an electrode active material, and the prepared active material was pulverized. The pulverized active material was mixed with aluminum alkoxide in an environment of 25° C. with a dew point of 10° C. such that a weight of aluminum relative to the active material was 0.1% by weight. Thereafter, drying treatment was carried out at 130° C. environment for 24 hours.

This active material was mixed with acetylene black as an electro-conductive agent. A mixing ratio was 90:5. This mixture was dispersed in N-methyl-2-pyrrolidone (NMP) to obtain a dispersion solution. The obtained dispersion solution was mixed with 5 parts by weight of polyvinylidene fluoride (PVdF) as a binder with respect to 100 parts by weight of the active material to prepare a negative electrode slurry.

A nonaqueous electrolyte battery was prepared in the same manner as in Example 1, except that this negative electrode slurry was used.

Comparative Example 8

An active material ($Li_2Na_{0.5}Ti_{5.5}Nb_{0.5}O_{14}$), synthesized in the same manner as in Example 1, was prepared as an electrode active material, and the prepared active material was pulverized. The pulverized active material was mixed with aluminum alkoxide in an environment of 25° C. with a dew point of −40° C. such that a weight of aluminum relative to the active material was 0.1% by weight. Thereafter, drying treatment was carried out under an environment of 25° C. with a dew point of −40° C. for 48 hours.

A nonaqueous electrolyte battery was prepared in the same manner as in Comparative Example 7, except that the negative electrode slurry was prepared using this active material.

Comparative Example 9

A nonaqueous electrolyte battery was produced in the same manner as in Example 1, except that aging treatment was not performed after the battery unit was subjected to initial charging and discharging.

Comparative Example 10

A negative electrode precursor was prepared by the same procedure as in Comparative Example 1. A nonaqueous electrolyte battery was produced in the same procedure as in Example 1, except that this negative electrode precursor was used. That is, in Comparative Example 10, no alumina coating method was used, neither the method of mixing the aluminum alkoxide into the slurry nor the method of forming the alumina coating by immersing the electrode in the diluted solution.

As described above, XPS measurement was performed on the negative electrode contained in the nonaqueous electrolyte battery produced in Comparative Example 1. Further, the XPS measurement was also performed on the negative electrode included in the nonaqueous electrolyte battery produced in Example 1.

The obtained XPS spectra are illustrated in FIGS. 10 to 13. FIGS. 10 and 11 illustrate the XPS spectra in a binding energy range of 680 eV to 700 eV regarding the negative electrodes in Example 1 and Comparative Example 1, respectively. FIGS. 12 and 13 illustrate the XPS spectra in a binding energy range of 525 eV to 545 eV for the negative electrodes in Example 1 and Comparative Example 1, respectively.

Spectra illustrated by solid lines in FIGS. 10 and 11 are measured XPS spectra of the electrode surface measured in the binding energy range of 680 eV to 700 eV regarding the negative electrodes in Comparative Example 1 and Example 1, respectively. The XPS spectrum illustrated in FIG. 10 has a peak F'1S attributed to a 1s orbital of F in a binding energy range of 680 eV to 692 eV. Similarly, the XPS spectrum illustrated in FIG. 11 has a peak F1S attributed to the is orbital of F in the binding energy range of 680 eV to 692 eV.

A curve indicated by a dotted line in FIG. 10 is a peak component $P'_{F2}$ in Comparative Example 1. A curve indicated by a dotted-dashed line in FIG. 10 is a peak component $P'_{F2}$ in Comparative Example 1. Each of these peak components are obtained by dividing a fitting spectrum obtained from the measured XPS spectrum indicated by the solid line. Specifically, the fitting spectrum was obtained by subjecting an approximate spectrum, obtained by approximating the measured XPS spectrum with a Gaussian curve:Lorentz curve=90:10, to fitting to an XPS spectrum measured again. The peak components $P'_{F1}$ and $P'_{F2}$ in FIG. 10 are obtained by fitting while regarding peak positions (positions of peak tops) thereof as 688.05 eV and 686.42 eV, respectively, and regarding half widths thereof as 2.8 eV.

Similarly, a curve indicated by a dotted line in FIG. 11 is a peak component $P_{F1}$ in Example 1. A curve indicated by a dotted-dashed line in FIG. 11 is a peak component $P_{F2}$ in Example 1. The peak components $P_{F1}$ and $P_{F2}$ in FIG. 11 are obtained by fitting while regarding peak positions (positions of peak tops) thereof as 688.29 eV and 685.97 eV, respectively, and regarding half widths thereof as 2.2 eV.

As described above, a value obtained by dividing the area of the peak component $P'_{F2}$ illustrated in FIG. 10 by the area of the peak component $P'_{F1}$ corresponds to a ratio F2/F1 in the negative electrode of Comparative Example 1. The ratio F2/F1 obtained from the spectrum illustrated in FIG. 10 was 0.85.

Similarly, a value obtained by dividing the area of the peak component $P_{F2}$ illustrated in FIG. 11 by the area of the peak component $P_{F1}$ corresponds to a ratio F2/F1 in the negative electrode of Example 1. The ratio F2/F1 obtained from the spectrum illustrated in FIG. 11 was 0.43.

Meanwhile, spectra illustrated by solid lines in FIGS. 12 and 13 are measured XPS spectra of the electrode surface measured in a binding energy range of 526 eV to 546 eV regarding the negative electrodes in Comparative Example 1 and Example 1, respectively. The XPS spectrum illustrated in FIG. 12 has a peak O'1S attributed to a is orbit of O in the binding energy range of 528 eV to 538 eV. Similarly, the XPS spectrum illustrated in FIG. 13 has a peak O1S attributed to a is orbit of O in the binding energy range of 528 eV to 538 eV.

A curve indicated by a dotted line in FIG. 12 is a peak component $P'_{O1A}$ in Comparative Example 1. A curve indicated by a dotted-dashed line in FIG. 12 is a peak component $P'_{O1B}$ in Comparative Example 1. Each of these peak components are obtained by dividing a fitting spectrum obtained from the measured XPS spectrum indicated by the solid line. Specifically, the fitting spectrum was obtained by subjecting an approximate spectrum, obtained by approximating the measured XPS spectrum with a Gaussian curve:Lorentz curve=90:10, to fitting to an XPS spectrum measured again. The peak components $P'_{O1A}$ and $P'_{O1B}$ in FIG. 12 are obtained by fitting while regarding peak positions (positions of peak tops) thereof as 531.99 eV and 533.63 eV, respectively, and regarding half widths thereof as 2.2 eV.

Similarly, a curve indicated by a dotted line in FIG. 13 is a peak component $P_{O1A}$ in Example 1. A curve indicated by a dotted-dashed line in FIG. 13 is a peak component $P_{O1B}$ in Example 1. The peak components $P_{O1A}$ and $P_{O1B}$ in FIG. 13 are obtained by fitting while regarding peak positions (positions of peak tops) thereof as 530.32 eV and 532.2 eV, respectively, and regarding half widths thereof as 2.1 eV.

As described above, a value obtained by dividing the area of the peak component $P'_{O1A}$ illustrated in FIG. 12 by the area of the peak component $P'_{O1B}$ corresponds to a ratio O1A/O1B in the negative electrode of Comparative Example 1. The ratio O1A/O1B obtained from the spectrum illustrated in FIG. 12 was 1.45.

Similarly, a value obtained by dividing the area of the peak component $P_{O1A}$ illustrated in FIG. 13 by the area of the peak component $P_{O1B}$ corresponds to a ratio O1A/O1B in the negative electrode of Example 1. The ratio O1A/O1B obtained from the spectrum illustrated in FIG. 13 was 5.8.

Further, aluminum content ratios (weight ratio relative to the active material) in the active material-containing layers of the negative electrodes and ratios $A_N/A_{Al}$ between an aluminum component amount $A_{Al}$ and a nitrogen component amount $A_N$ were obtained from the measured XPS spectrum.

The ratios F2/F1, the ratios O1A/O1B, the Al content ratios and the ratios $A_N/A_{Al}$ obtained regarding the negative electrodes in the respective examples and the respective comparative examples are summarized in the following Table 3.

TABLE 3

| | F2/F1 | O1A/O1B | Al Content Ratio in Active Material-Containing Layer (wt %) | $A_N/A_{Al}$ |
|---|---|---|---|---|
| Example 1 | 0.43 | 5.8 | 0.1 | 3.3 |
| Example 2 | 0.45 | 5.6 | 0.2 | 2 |
| Example 3 | 0.44 | 5.7 | 0.3 | 1 |
| Example 4 | 0.38 | 5.3 | 0.1 | 0.3 |
| Example 5 | 0.39 | 5.5 | 0.1 | 0.5 |
| Example 6 | 0.41 | 5.6 | 0.1 | 1.6 |
| Example 7 | 0.38 | 4.8 | 0.1 | 1.3 |
| Example 8 | 0.42 | 5.7 | 0.1 | 3.2 |
| Example 9 | 0.44 | 5.5 | 0.2 | 1.9 |
| Example 10 | 0.45 | 5.6 | 0.3 | 0.8 |
| Example 11 | 0.4 | 5.4 | 0.1 | 0.25 |
| Example 12 | 0.41 | 5.6 | 0.1 | 0.45 |
| Example 13 | 0.42 | 5.6 | 0.1 | 1.5 |
| Example 14 | 0.4 | 4.5 | 0.1 | 1.5 |
| Example 15 | 0.43 | 5.2 | 0.1 | 3.2 |
| Example 16 | 0.42 | 5.3 | 0.1 | 3.5 |
| Example 17 | 0.4 | 5.3 | 0.1 | 3.3 |
| Comparative Example 1 | 0.85 | 1.45 | 0 | — |
| Comparative Example 2 | 0.7 | 1.9 | 0.05 | 0 |
| Comparative Example 3 | 0.78 | 1.3 | 0 | — |
| Comparative Example 4 | 0.8 | 1.7 | 0.05 | 0 |
| Comparative Example 5 | 0.8 | 1.4 | 0 | — |
| Comparative Example 6 | 0.81 | 1.8 | 0.05 | 0 |
| Comparative Example 7 | 0.78 | 2.2 | 0.1 | 5.5 |
| Comparative Example 8 | 0.75 | 2.1 | 0.1 | 6 |
| Comparative Example 9 | 0.73 | 2.3 | 0.1 | 4 |
| Comparative Example 10 | 0.75 | 2.0 | 0 | — |

[Evaluation]

The respective nonaqueous electrolyte batteries produced in each of the examples and each of the comparative examples were evaluated by the following procedure. Hereinafter, as a representative, an evaluation procedure of the nonaqueous electrolyte battery of Example 1 will be described. Each of the nonaqueous electrolyte batteries of the other examples and comparative examples were also evaluated in the same manner as the nonaqueous electrolyte battery of Example 1.

<Rapid Discharge Test>

After aging treatment, capacity examination on 1 C discharge capacity and 5 C discharge capacity was performed for the nonaqueous electrolyte battery of Example 1 by the following procedure. First, the nonaqueous electrolyte battery of Example 1 was subjected to constant current charging (CC charging) at 1.0 A until a battery voltage reached 2.9 V, and then, subjected to constant voltage charging (CV charging) at 2.9 V for 3 hours. When examining the 1C discharge capacity, the nonaqueous electrolyte battery in this state was subjected to discharging at a constant current of 1 A until the battery voltage reached 1.8 V, and a discharge capacity during this discharging was taken as the 1 C discharge capacity. When examining the 5 C discharge capacity, discharging was performed at 5 A. A value obtained by dividing the 5C discharge capacity by 1 C discharge capacity was calculated. This value is expressed as a "5C/1C discharge capacity ratio" and shown in Table 4 below.

<Charge-and-Discharge Cycle Test>

After examining the 5C discharge capacity, the nonaqueous electrolyte battery was charged to 1 A to obtain a half-charged state. A battery resistance ($R_1$) in this state was measured.

Thereafter, the nonaqueous electrolyte battery was subjected to a charge-and-discharge cycle test at 5C/5C in an environment of 60° C. to investigate a change in discharge capacity. Specifically, charging at 5 C and discharging at 5 C performed in a battery voltage range of 1.8 V to 2.9 V was set as one cycle, and 200 cycles of charging and discharging were performed.

After 200 cycles of charging and discharging, a discharge capacity and a battery resistance (R2) were measured again.

A value obtained by dividing the discharge capacity after performing 200 cycles of charging and discharging by the discharge capacity before performing 200 cycles of charging and discharging was calculated. This value expresses the discharge capacity after 200 cycles with respect to the initial discharge capacity in percentage and represents the change in discharge capacity. This value is expressed as a "capacity retention ratio" and is shown in Table 4 below.

Further, a value obtained by dividing the battery resistance R2 after 200 cycles of charging and discharging by the battery resistance R1 before 200 cycles of charging and discharging was calculated. This value represents a rate of the change in battery resistance before and after 200 cycles of charging and discharging. This value is expressed as "R2/R1" and shown in Table 4 below.

The range of the battery voltage at which charging and discharging was performed in each of the above tests was appropriately adjusted according to the negative electrode active material. Specifically, the negative electrode active materials used in Examples 1 to 15 and Comparative Examples 1 to 10 correspond to an orthorhombic titanium-containing composite oxide represented by $Li_{2+a}M(I)_{2-b}Ti_{6-c}M(II)_dO_{14+\sigma}$. For each of the nonaqueous electrolyte batteries produced in these examples and comparative examples, charging and discharging was performed in a battery voltage range of from 1.8 V to 2.9 V. In Example 16, the niobium-titanium composite oxide $TiNb_2O_7$ was used as the negative electrode active material. For the nonaqueous electrolyte battery produced in Example 16, charging and discharging was performed in a battery voltage range of from 1.8 V to 3.0 V. In Example 17, the spinel type lithium titanate $Li_4Ti_5O_{12}$ was used as the negative electrode active material. For the nonaqueous electrolyte battery produced in Example 17, charging and discharging was performed in a battery voltage range of from 1.8 V to 2.8 V.

Results of the above evaluation tests are summarized in Table 4. Specifically, Table 4 shows the 5C/1C discharge capacity ratios, and capacity retention ratios and R2/R1 in the 200 cycles of charge/discharge test regarding the nonaqueous electrolyte batteries produced in the respective examples and the respective comparative examples.

TABLE 4

| | 5 C/1 C | After 200 Cycles of Charging and Discharging at 60° C. and 5 C/5 C | |
|---|---|---|---|
| | Discharge Capacity Ratio (%) | Capacity Retention Ratio (%) | R2/R1 |
| Example 1 | 95 | 99 | 1.38 |
| Example 2 | 93 | 97 | 1.36 |
| Example 3 | 92 | 96 | 1.33 |
| Example 4 | 96 | 95 | 1.2 |
| Example 5 | 95.5 | 97 | 1.2 |
| Example 6 | 95.2 | 98 | 1.3 |
| Example 7 | 96 | 96 | 1.25 |
| Example 8 | 94 | 98 | 1.36 |
| Example 9 | 94 | 96.5 | 1.35 |
| Example 10 | 93 | 95 | 1.32 |
| Example 11 | 97 | 94 | 1.2 |
| Example 12 | 96 | 96 | 1.21 |
| Example 13 | 95 | 97 | 1.2 |
| Example 14 | 94 | 95 | 1.1 |
| Example 15 | 95 | 98 | 1.4 |
| Example 16 | 95 | 95 | 1.5 |
| Example 17 | 98 | 99 | 1.2 |
| Comparative Example 1 | 82 | 85 | 1.2 |
| Comparative Example 2 | 89 | 90 | 1.2 |
| Comparative Example 3 | 78 | 78 | 1.1 |
| Comparative Example 4 | 79 | 80 | 1.1 |
| Comparative Example 5 | 81 | 83 | 1.2 |
| Comparative Example 6 | 82 | 84 | 1.2 |
| Comparative Example 7 | 83 | 84 | 1.6 |
| Comparative Example 8 | 79 | 83 | 1.5 |
| Comparative Example 9 | 78 | 78 | 1.8 |
| Comparative Example 10 | 78 | 84 | 1.8 |

As shown in Table 4, the 5C/1C discharge capacity ratios obtained in Comparative Examples 1 to 10 were lower than the 5C/1C discharge capacity ratios in the nonaqueous electrolyte batteries produced in Examples 1 to 17. Further, regarding the capacity retention ratio in the 200 cycles of charge/discharge test, as well, the capacity retention ratios in Comparative Examples 1 to 10 were lower than the capacity retention ratios obtained in Examples 1 to 17.

Thus, the nonaqueous electrolyte batteries produced in Examples 1 to 17 in which the ratio F2/F1 regarding the negative electrode was 0.1 to 0.6 (Table 3) exhibited excellent output performance and excellent cycle life performance. On the other hand, all the nonaqueous electrolyte batteries obtained in Comparative Examples 1 to 10, in which the ratio F2/F1 exceeded 0.6, exhibited lower output performance and lower cycle life performance. It can be inferred that this is because a constituent ratio of the film containing fluorine in the negative electrode (a ratio between fluorine bonded to organic atoms and fluorine bonded to metal ions) and the constituents of the film containing oxygen were not appropriate in Comparative Examples 1 to 10, and so side reactions at the negative electrode could not be suppressed.

Since the cycle life performance was excellent, it is suggested that the side reaction between the negative electrode and the nonaqueous electrolyte was suppressed in Examples 1 to 17. From this, it can be inferred that appropriate coating films have been formed at the negative electrode as indicated by the values of the ratio F2/F1 in Table 3.

Since the output performance (5C/1C discharge capacity ratio) was excellent, it is suggested that the battery resistance was not high in Examples 1 to 17. From this, it can be inferred that the increase in battery resistance was suppressed although the coat sufficient to suppress side reactions was formed at the negative electrode. In addition, the amount was small concerning the change in battery resistance (R2/R1) from before to after repeating charging and discharging at a high rate (5C/5C) in a high temperature environment (60° C.) for 200 cycles.

Even in Comparative Examples 1 to 6, the change in battery resistance (R2/R1) from before to after performing the charge-and-discharge cycle test was small. However, the output performance (5C/1C discharge capacity ratio) was originally low in Comparative Examples 1 to 6. Thus, it can be considered that the rate of the increase in battery resistance had appeared as being low because the battery resistance before performing the charge-and-discharge cycle test was high.

In Comparative Examples 7 to 10, the orthorhombic titanium-containing composite oxide $Li_2Na_{0.5}Ti_{5.5}Nb_{0.5}O_{14}$ was used as the negative electrode active material in the same manner as in Examples 1 to 14. In Comparative Examples 7 to 10, the change in battery resistance (R2/R1) from before to after performing 200 cycles of charging/discharging was larger than that in Examples 1 to 14. Since the ratio $A_N/A_{Al}$ in the negative electrode active material-containing layer was large in Comparative Examples 7 and 8, it can be considered that the Al component amount was small so that there had not been sufficient suppression of the increase in battery resistance caused by the N component. It can be inferred that the reason why the Al component amount was small is due to the film coat being removed during the preparation of the negative electrode slurry, as the alumina coating process was performed on the negative electrode active material before preparing the negative electrode slurry. The aging treatment was not performed in Comparative Example 9. Thus, it can be considered that the battery resistance increased during charging and discharging as a result of failure to obtain the film capable of suppressing the side reaction at the negative electrode. The alumina coating process was not performed in Comparative Example 10. Thus, it can be considered that there was no Al component and there was not obtained the effect of suppressing the increase in battery resistance caused by the N component.

According to one or more embodiments and examples described above, the electrode including the active material-containing layer and the film is provided. The active material-containing layer contains an active material containing a titanium-containing oxide. The film is present on at least a part of a surface of the active material-containing layer. The film contains fluorine, organic atoms, and metal ions. The film includes fluorine bonded to the organic atoms and fluorine bonded to the metal ions. The film satisfies a relationship of Formula (1): $0.1 \leq F2/F1 \leq 0.6$. In Formula (1), F1 is a proportion of the fluorine bonded to the organic atoms, and F2 is a proportion of the fluorine bonded to metal ions.

The electrode can realize the secondary battery exhibiting excellent output performance and excellent cycle life performance. Thus, it is possible to provide the secondary battery exhibiting excellent output performance and excellent cycle life performance, the battery pack including the secondary battery, and the vehicle onto which the battery pack is installed.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electrode comprising:
an active material-containing layer comprising an active material, aluminum and nitrogen, the active material comprising a titanium-containing oxide, and a content ratio of the aluminum to the active material in the active material-containing layer being 0.025% by weight to 0.3% by weight; and
a film present on at least a part of a surface of the active material-containing layer, the film comprising fluorine, an organic atom, and a metal ion, the fluorine comprising fluorine bonded to the organic atom and comprising fluorine bonded to the metal ion, and the film satisfying a relationship of Formula (1) below, where F1 is a proportion of the fluorine bonded to the organic atom and F2 is a proportion of the fluorine bonded to the metal ion:

$$0.1 \leq F2/F1 \leq 0.6 \qquad (1).$$

2. The electrode according to claim 1, wherein
the film further comprises oxygen bonded to the organic atom, and
the film satisfies a relationship of Formula (2) below, where O1A is an amount of oxygen attributed to a peak having a peak top at a position of 532±0.5 eV in an X-ray photoelectron spectrum among the oxygen bonded to the organic atom and O1B is an amount of oxygen attributed to a peak having a peak top at 534±0.5 eV in the X-ray photoelectron spectrum among the oxygen bonded to the organic atom:

$$2.5 \leq O1A/O1B \leq 6 \qquad (2).$$

3. The electrode according to claim 1, wherein
a ratio $A_N/A_{Al}$ between an aluminum component amount $A_{Al}$ and a nitrogen component amount $A_N$ in the active material-containing layer is 0.1 to 4.

4. A secondary battery comprising:
a negative electrode;
a positive electrode; and
an electrolyte,
wherein the negative electrode comprises the electrode according to claim 1.

5. A battery pack comprising the secondary battery according to claim 4.

6. The battery pack according to claim 5, further comprising:
an external power distribution terminal; and
a protective circuit.

7. The battery pack according to claim 5, comprising plural of the secondary battery, the secondary batteries being electrically connected in series, in parallel, or in a combination of in a series and in parallel.

8. A vehicle comprising the battery pack according to claim 5.

9. The vehicle according to claim 8, which comprises a mechanism configured to convert kinetic energy of the vehicle into regenerative energy.

* * * * *